US012772165B2

(12) United States Patent
Elshafie et al.

(10) Patent No.: US 12,772,165 B2
(45) Date of Patent: Oct. 20, 2026

(54) CELL WAKE-UP SIGNAL FORMATS AND CONTENTS AND SYNCHRONIZATION SIGNAL BLOCK CONTENTS

(71) Applicant: QUALCOMM Incorporated, San Diego, CA (US)

(72) Inventors: Ahmed Elshafie, San Diego, CA (US); Diana Maamari, San Diego, CA (US); Yan Zhou, San Diego, CA (US); Marwen Zorgui, San Diego, CA (US); Ahmed Attia Abotabl, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 687 days.

(21) Appl. No.: 18/319,231

(22) Filed: May 17, 2023

(65) Prior Publication Data

US 2024/0389017 A1 Nov. 21, 2024

(51) Int. Cl.
*H04W 52/02* (2009.01)

(52) U.S. Cl.
CPC ............................... *H04W 52/0206* (2013.01)

(58) Field of Classification Search
CPC ................................................. H04W 52/0206
See application file for complete search history.

(56) References Cited

U.S. PATENT DOCUMENTS

2024/0276380 A1* 8/2024 Leng ..................... H04W 76/27
2025/0081103 A1* 3/2025 Zhou ..................... H04W 76/27

* cited by examiner

*Primary Examiner* — Gbemileke J Onamuti
(74) *Attorney, Agent, or Firm* — Harrity & Harrity, LLP

(57) ABSTRACT

Various aspects of the present disclosure generally relate to wireless communication. In some aspects, a user equipment (UE) may receive, from a network node, cell wake-up signal (C-WUS) configuration information indicating a plurality of C-WUS formats, each C-WUS format of the plurality of C-WUS formats associated with respective information. The UE may transmit, to the network node, a C-WUS associated with a C-WUS format of the plurality of C-WUS formats, the C-WUS including the respective information associated with the C-WUS format. Numerous other aspects are described.

30 Claims, 15 Drawing Sheets

CELL WAKE-UP SIGNAL FORMATS AND CONTENTS AND SYNCHRONIZATION SIGNAL BLOCK CONTENTS

FIELD OF THE DISCLOSURE

Aspects of the present disclosure generally relate to wireless communication and to techniques and apparatuses for network energy savings using a cell wake-up signal (C-WUS) and/or a simplified version of a synchronization signal block (SSB).

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a user equipment (UE). The UE may include one or more memories and one or more processors coupled to the one or more memories. The one or more processors may be configured to receive, from a network node, cell wake-up signal (C-WUS) configuration information indicating a plurality of C-WUS formats, each C-WUS format of the plurality of C-WUS formats associated with respective information. The one or more processors may be configured to transmit, to the network node, a C-WUS associated with a C-WUS format of the plurality of C-WUS formats, the C-WUS including the respective information associated with the C-WUS format.

Some aspects described herein relate to a network node. The network node may include one or more memories and one or more processors coupled to the one or more memories. The one or more processors may be configured to transmit C-WUS configuration information indicating a plurality of C-WUS formats, each C-WUS format of the plurality of C-WUS formats associated with respective information. The one or more processors may be configured to receive, from a UE, a C-WUS associated with a C-WUS format of the plurality of C-WUS formats, the C-WUS including the respective information associated with the C-WUS format.

Some aspects described herein relate to a UE. The UE may include one or more memories and one or more processors coupled to the one or more memories. The one or more processors may be configured to receive, from a network node, a first synchronization signal block (SSB) associated with a first network energy state (NES) of the network node, the first SSB including a first master information block (MIB) indicating first information different from second information indicated in a second MIB included in a second SSB associated with a second NES of the network node. The one or more processors may be configured to communicate with the network node based at least in part on the first SSB.

Some aspects described herein relate to a network node. The network node may include one or more memories and one or more processors coupled to the one or more memories. The one or more processors may be configured to transmit a first SSB associated with a first NES of the network node, the first SSB including a first MIB indicating first information different from second information indicated in a second MIB included in a second SSB associated with a second NES of the network node. The one or more processors may be configured to communicate with a UE based at least in part on the first SSB.

Some aspects described herein relate to a method of wireless communication performed by a UE. The method may include receiving, from a network node, C-WUS configuration information indicating a plurality of C-WUS formats, each C-WUS format of the plurality of C-WUS formats associated with respective information. The method may include transmitting, to the network node, a C-WUS associated with a C-WUS format of the plurality of C-WUS formats, the C-WUS including the respective information associated with the C-WUS format.

Some aspects described herein relate to a method of wireless communication performed by a network node. The method may include transmitting C-WUS configuration information indicating a plurality of C-WUS formats, each C-WUS format of the plurality of C-WUS formats associated with respective information. The method may include receiving, from a UE, a C-WUS associated with a C-WUS format of the plurality of C-WUS formats, the C-WUS including the respective information associated with the C-WUS format.

Some aspects described herein relate to a method of wireless communication performed by a UE. The method may include receiving, from a network node, a first SSB associated with a first NES of the network node, the first SSB including a first MIB indicating first information different from second information indicated in a second MIB included in a second SSB associated with a second NES of the network node. The method may include communicating with the network node based at least in part on the first SSB.

Some aspects described herein relate to a method of wireless communication performed by a network node. The method may include transmitting a first SSB associated with a first NES of the network node, the first SSB including a first MIB indicating first information different from second information indicated in a second MIB included in a second SSB associated with a second NES of the network node. The method may include communicating with a UE based at least in part on the first SSB.

Some aspects described herein relate to a non-transitory computer-readable medium that stores a set of instructions for wireless communication by a UE. The set of instructions, when executed by one or more processors of the UE, may cause the UE to receive, from a network node, C-WUS configuration information indicating a plurality of C-WUS formats, each C-WUS format of the plurality of C-WUS formats associated with respective information. The set of instructions, when executed by one or more processors of the UE, may cause the UE to transmit, to the network node, a C-WUS associated with a C-WUS format of the plurality of C-WUS formats, the C-WUS including the respective information associated with the C-WUS format.

Some aspects described herein relate to a non-transitory computer-readable medium that stores a set of instructions for wireless communication by a network node. The set of instructions, when executed by one or more processors of the network node, may cause the network node to transmit C-WUS configuration information indicating a plurality of C-WUS formats, each C-WUS format of the plurality of C-WUS formats associated with respective information. The set of instructions, when executed by one or more processors of the network node, may cause the network node to receive, from a UE, a C-WUS associated with a C-WUS format of the plurality of C-WUS formats, the C-WUS including the respective information associated with the C-WUS format.

Some aspects described herein relate to a non-transitory computer-readable medium that stores a set of instructions for wireless communication by a UE. The set of instructions, when executed by one or more processors of the UE, may cause the UE to receive, from a network node, a first SSB associated with a first NES of the network node, the first SSB including a first MIB indicating first information different from second information indicated in a second MIB included in a second SSB associated with a second NES of the network node. The set of instructions, when executed by one or more processors of the UE, may cause the UE to communicate with the network node based at least in part on the first SSB.

Some aspects described herein relate to a non-transitory computer-readable medium that stores a set of instructions for wireless communication by a network node. The set of instructions, when executed by one or more processors of the network node, may cause the network node to transmit a first SSB associated with a first NES of the network node, the first SSB including a first MIB indicating first information different from second information indicated in a second MIB included in a second SSB associated with a second NES of the network node. The set of instructions, when executed by one or more processors of the network node, may cause the network node to communicate with a UE based at least in part on the first SSB.

Some aspects described herein relate to an apparatus for wireless communication. The apparatus may include means for receiving, from a network node, C-WUS configuration information indicating a plurality of C-WUS formats, each C-WUS format of the plurality of C-WUS formats associated with respective information. The apparatus may include means for transmitting, to the network node, a C-WUS associated with a C-WUS format of the plurality of C-WUS formats, the C-WUS including the respective information associated with the C-WUS format.

Some aspects described herein relate to an apparatus for wireless communication. The apparatus may include means for transmitting C-WUS configuration information indicating a plurality of C-WUS formats, each C-WUS format of the plurality of C-WUS formats associated with respective information. The apparatus may include means for receiving, from a UE, a C-WUS associated with a C-WUS format of the plurality of C-WUS formats, the C-WUS including the respective information associated with the C-WUS format.

Some aspects described herein relate to an apparatus for wireless communication. The apparatus may include means for receiving, from a network node, a first SSB associated with a first NES of the network node, the first SSB including a first MIB indicating first information different from second information indicated in a second MIB included in a second SSB associated with a second NES of the network node. The apparatus may include means for communicating with the network node based at least in part on the first SSB.

Some aspects described herein relate to an apparatus for wireless communication. The apparatus may include means for transmitting a first SSB associated with a first NES of the apparatus, the first SSB including a first MIB indicating first information different from second information indicated in a second MIB included in a second SSB associated with a second NES of the apparatus. The apparatus may include means for communicating with a UE based at least in part on the first SSB.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals May include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Figure 1:
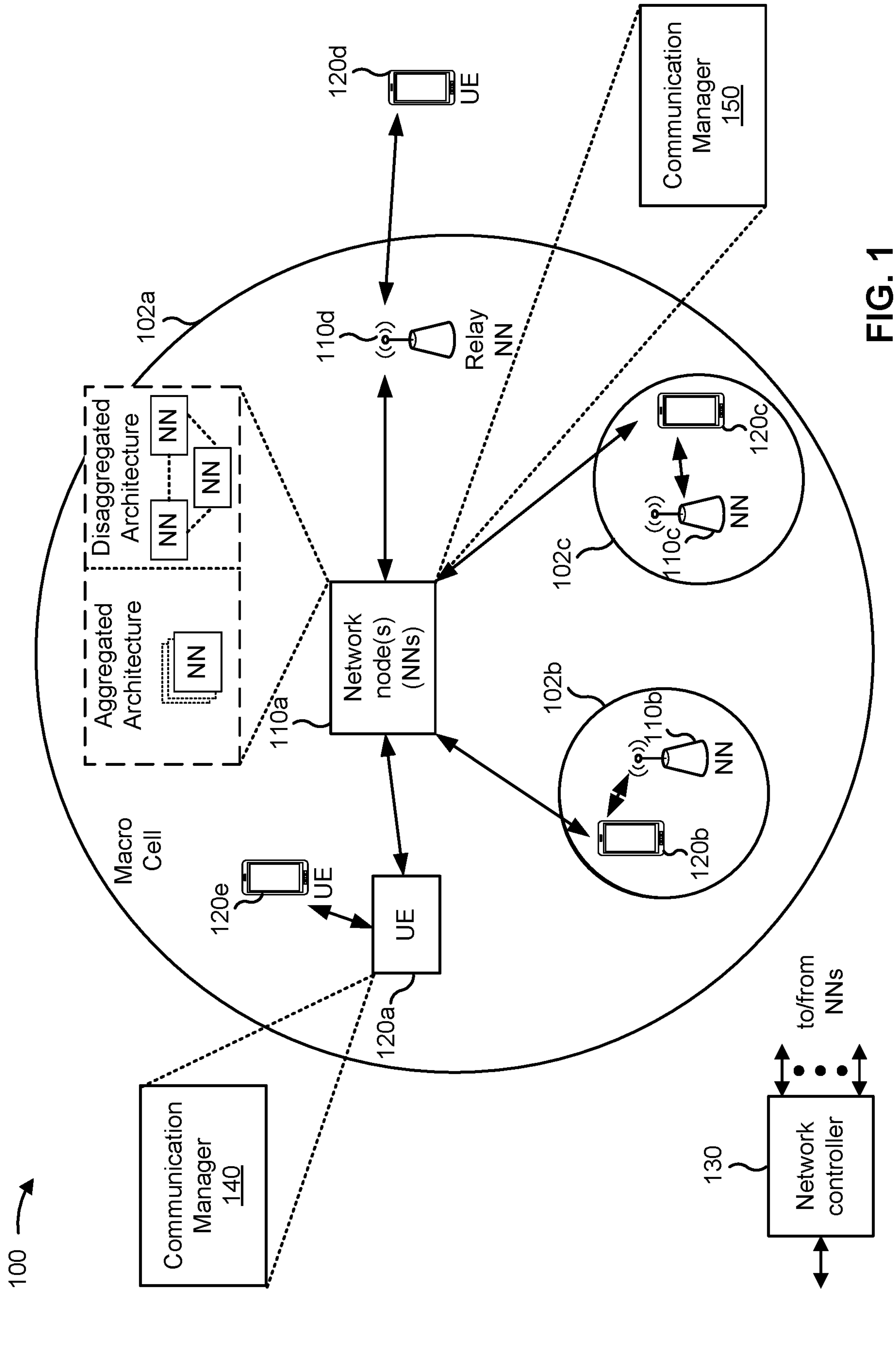
FIG. 1 is a diagram illustrating an example of a wireless network, in accordance with the present disclosure.

For various reasons, network energy saving and/or network energy efficiency measures are expected to have increased importance in wireless network operations. For example, although New Radio (NR) generally offers a significant energy efficiency improvement per gigabyte over previous generations (for example, LTE), new NR use cases and/or the adoption of millimeter wave frequencies may require further improvements to energy efficiency. Furthermore, even with the improved energy efficiency of NR, energy costs still account for a significant proportion of the cost to operate a wireless network. For example, according to some estimates, energy costs are about one-fourth the total cost to operate a wireless network. The largest proportion of energy consumption and/or energy costs are associated with a radio access network (RAN), with data centers and fiber transport accounting for smaller shares. Accordingly, measures to increase network energy savings and/or improve network energy efficiency are important factors that may drive adoption and/or expansion of wireless networks.

Various aspects relate generally to a cell wake-up signal (C-WUS) associated with a cell discontinuous reception (DRX) mode. Some aspects more specifically relate to contents and formats of a C-WUS to be transmitted by a user equipment (UE) to activate a network node from an inactive or sleep state. In some aspects, a network node may transmit, and a UE may receive, C-WUS configuration information indicating multiple C-WUS formats, with each C-WUS format, of the multiple C-WUS formats, being associated with respective information to be included in the C-WUS transmission.

The UE may transmit, and the network node may receive, a C-WUS associated with a C-WUS format of the multiple C-WUS formats. The C-WUS may include the respective information associated with the C-WUS format. In some examples, the network node may switch from a first network energy state (NES) to a second NES in connection with receiving the C-WUS. For example, the network node may switch from a sleep state or an inactive state to an active state in connection with receiving the C-WUS. In some examples, the UE and the network node may communicate based in part on the respective information included in the C-WUS and associated with the C-WUS format of the C-WUS. For example, the information included in the C-WUS may include information relating to traffic to be transmitted by the UE, an energy state of the UE, a requested time for the UE to receive a system information block type 1 (SIB1), a sidelink scheduling request, beam information, configuration preferences, and/or capability information, among other examples.

Various aspects relate generally to a simplified version of a synchronization signal block (SSB) for network energy savings. Some aspects more specifically relate to contents of the simplified version of the SSB including information about NESS and/or support of a wake-up radio (WUR) of a UE. In some aspects, a network node may transmit, and a UE may receive, a first SSB associated with an NES of the network node. The first SSB may include a first master information block (MIB) indicating first information that is different from second information indicated in a second MIB of a second SSB associated with a second NES of the network node. The UE and the network node may communicate based at least in part on the first information included in the first SSB. In some examples, the first NES may be associated with a reduced power consumption by the network node, as compared to the second NES, and the first information indicated in the first MIB of the first SSB may include a reduced amount of information, as compared to the second information indicated in the second MIB of the second SSB. In some examples, the first information may include information relating to one or more NESs of the network node and/or information indicating support for low power wake-up signal (LP-WUS) transmission associated with one or more WURs.

Particular aspects of the subject matter described in this disclosure can be implemented to realize one or more of the following potential advantages. In some examples, by including, in a C-WUS transmission, information in addition to an indication for the network node to switch to an active mode, the described techniques can be used to decrease signaling overhead between the UE and the network node once the network node receives the C-WUS and switches to an active state. Furthermore, by including information in the C-WUS transmission, instead of communicating the information between the UE and the network node after the network node receives the C-WUS and switches to the active state, the described techniques can be used to decrease latency of traffic (e.g., uplink traffic and/or sidelink traffic) to be transmitted by the UE and/or decrease an amount of time that the network node remains in the active state, thus increasing network energy savings. In some examples, by configuring different C-WUS formats associated with different information to be included in the C-WUS transmission, different C-WUS formats may be used to communicate different sets of information during C-WUS transmission, which may increase flexibility of the information included in C-WUS transmissions, resulting in further decreases in signaling overhead and latency and/or further increases in network energy savings.

In some examples, by transmitting first SSB associated with a first NES that is a different or simplified version of a second SSB associated with a second NES, the described techniques may be used to increase network energy savings in the first NES. In some examples, by including, in the first SSB, information relating to one or more NESs and/or support for LP-WUS transmission associated with one or more WURs, the described techniques may be used to decrease signaling overhead, increase network energy savings associated with the one or more NESs, and/or enable decreased power consumption by a UE using a WUR.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or NR radio access technology (RAT), aspects of the present disclosure can be applied to other RATs, such as a 3G RAT, a 4G RAT, and/or a RAT subsequent to 5G (e.g., 6G).

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110*a*, a network node 110*b*, a network node 110*c*, and a network node 110*d*), a UE 120 or multiple UEs 120 (shown as a UE 120*a*, a UE 120*b*, a UE 120*c*, a UE 120*d*, and a UE 120*c*), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single RAN node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110*a* may be a macro network node for a macro cell 102*a*, the network node 110*b* may be a pico network node for a pico cell 102*b*, and the network node 110*c* may be a femto network node for a femto cell 102*c*. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, an unmanned aerial vehicle, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*c*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHZ) and FR2 (24.25 GHz-52.6 GHZ). It should be understood that although a portion of FR1 is greater than 6 GHZ, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHZ-24.25 GHZ). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHZ. For example, three higher operating bands have been identified as frequency range designations FR4a or FR4-1 (52.6 GHZ-71 GHz), FR4 (52.6 GHZ-114.25 GHZ), and FR5 (114.25 GHZ-300 GHZ). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHZ, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive, from a network node, C-WUS configuration information indicating a plurality of C-WUS formats, each C-WUS format of the plurality of C-WUS formats associated with respective information; and transmit, to the network node, a C-WUS associated with a C-WUS format of the plurality of C-WUS formats, the C-WUS including the respective information associated with the C-WUS format. Additionally, or alternatively, as described in more detail elsewhere herein, the communication manager 140 may receive, from a network node, a first SSB associated with a first NES of the network node, the first SSB including a first MIB indicating first information different from second information indicated in a second MIB included in a second SSB associated with a second NES of the network node; and communicate with the network node based at least in part on the first SSB. Additionally, or alternatively, the communication manager 140 may perform one or more other operations described herein.

In some aspects, the network node 110 may include a communication manager 150. As described in more detail elsewhere herein, the communication manager 150 may transmit C-WUS configuration information indicating a plurality of C-WUS formats, each C-WUS format of the plurality of C-WUS formats associated with respective information; and receive, from a UE, a C-WUS associated with a C-WUS format of the plurality of C-WUS formats, the C-WUS including the respective information associated with the C-WUS format. Additionally, or alternatively, as described in more detail elsewhere herein, the communication manager 150 may transmit a first SSB associated with a first NES of the network node, the first SSB including a first MIB indicating first information different from second information indicated in a second MIB included in a second SSB associated with a second NES of the network node; and communicate with a UE based at least in part on the first SSB. Additionally, or alternatively, the communication manager 150 may perform one or more other operations described herein.

As indicated above, FIG. 1 is provided as an example. Other examples may differ from what is described with regard to FIG. 1.

Figure 2:
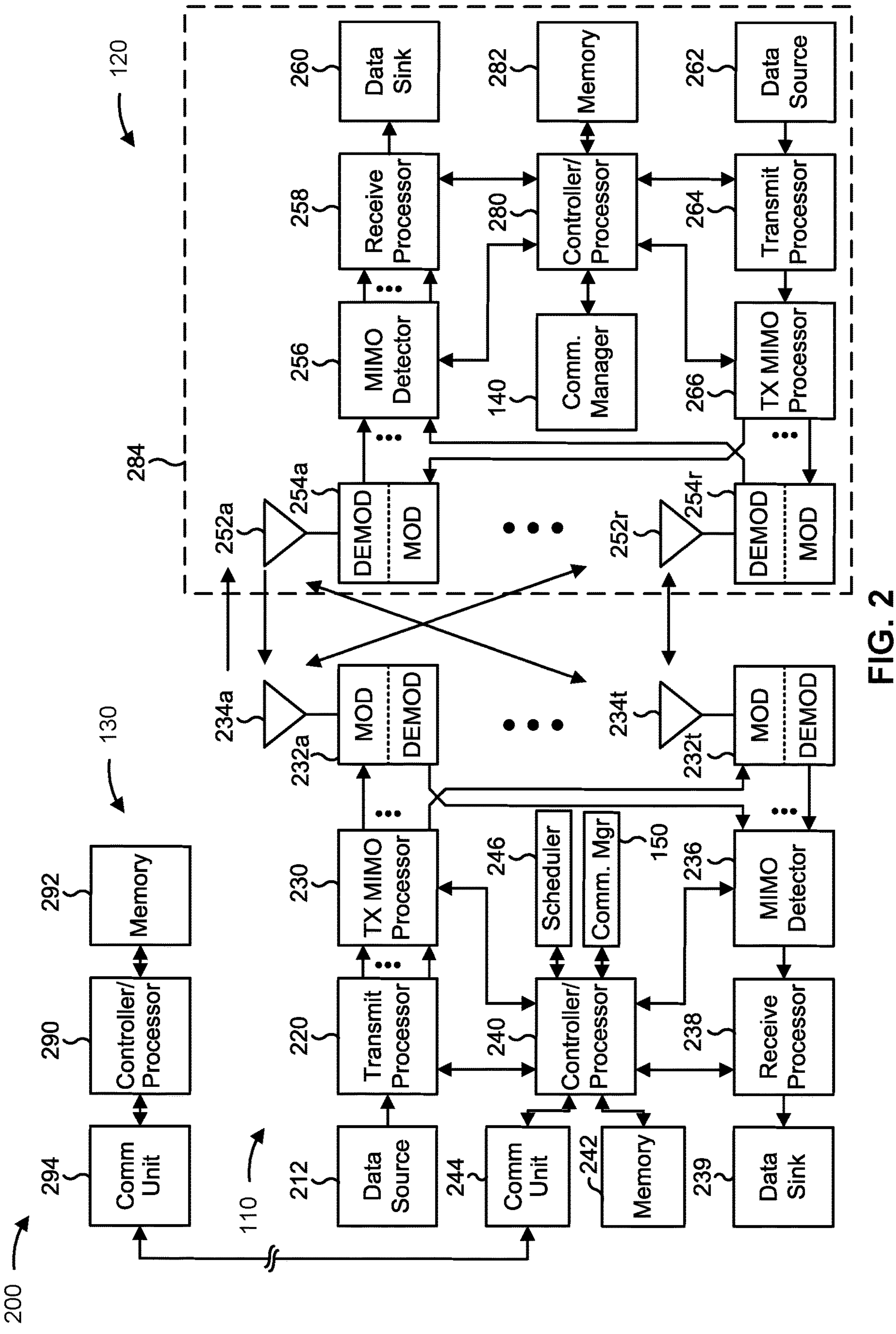
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234*a* through 234*t*, such as T antennas ($T \geq 1$). The UE 120 may be equipped with a set of antennas 252*a* through 252*r*, such as R antennas ($R \geq 1$). The network node 110 of example 200 includes one or more radio frequency components, such as antennas 234 and a modem 232. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232*a* through 232*t*. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232*a* through 232*t* may transmit a set of downlink signals (e.g., T downlink signals) via a corresponding set of antennas 234 (e.g., T antennas), shown as antennas 234*a* through 234*t*.

At the UE 120, a set of antennas 252 (shown as antennas 252*a* through 252*r*) may receive the downlink signals from the network node 110 and/or other network nodes 110 and may provide a set of received signals (e.g., R received signals) to a set of modems 254 (e.g., R modems), shown as modems 254*a* through 254*r*. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, May provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234*a* through 234*t* and/or antennas 252*a* through 252*r*) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 6A-6C and 7-13).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 6A-6C and 7-13).

The controller/processor 240 of the network node 110, the controller/processor 280 of the UE 120, and/or any other component(s) of FIG. 2 may perform one or more techniques associated with network energy savings using a C-WUS and/or a simplified version of an SSB, as described in more detail elsewhere herein. For example, the controller/processor 240 of the network node 110, the controller/processor 280 of the UE 120, and/or any other component(s) of FIG. 2 may perform or direct operations of, for example, process 800 of FIG. 8, process 900 of FIG. 9, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 800 of FIG. 8, process 900 of FIG. 9, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, a UE (e.g., the UE 120) includes means for receiving, from a network node, C-WUS configuration information indicating a plurality of C-WUS formats, each C-WUS format of the plurality of C-WUS formats associated with respective information; and/or means for transmitting, to the network node, a C-WUS associated with a C-WUS format of the plurality of C-WUS formats, the C-WUS including the respective information associated with the C-WUS format. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a UE (e.g., the UE 120) includes means for receiving, from a network node, a first SSB associated with a first NES of the network node, the first SSB including a first MIB indicating first information different from second information indicated in a second MIB included in a second SSB associated with a second NES of the network node; and/or means for communicating with the network node based at least in part on the first SSB. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network node (e.g., the network node 110) includes means for transmitting C-WUS configuration information indicating a plurality of C-WUS formats, each C-WUS format of the plurality of C-WUS formats associated with respective information; and/or means for receiving, from a UE, a C-WUS associated with a C-WUS format of the plurality of C-WUS formats, the C-WUS including the respective information associated with the C-WUS format. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

In some aspects, a network node (e.g., the network node 110) includes means for transmitting a first SSB associated with a first NES of the network node, the first SSB including a first MIB indicating first information different from second information indicated in a second MIB included in a second SSB associated with a second NES of the network node; and/or means for communicating with a UE based at least in part on the first SSB. The means for the network node to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
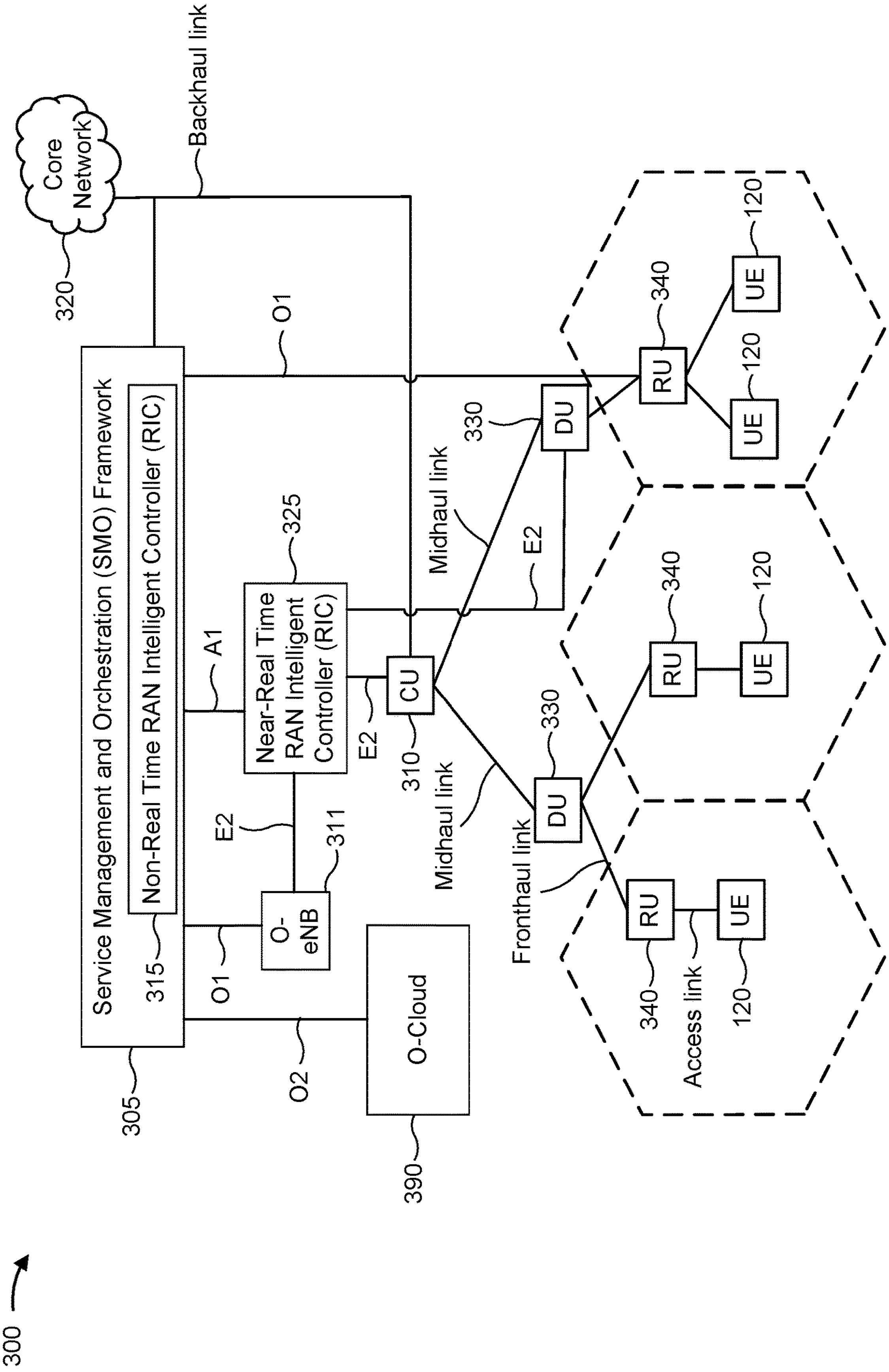
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit-User Plane (CU-UP) functionality), control plane functionality (for example, Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
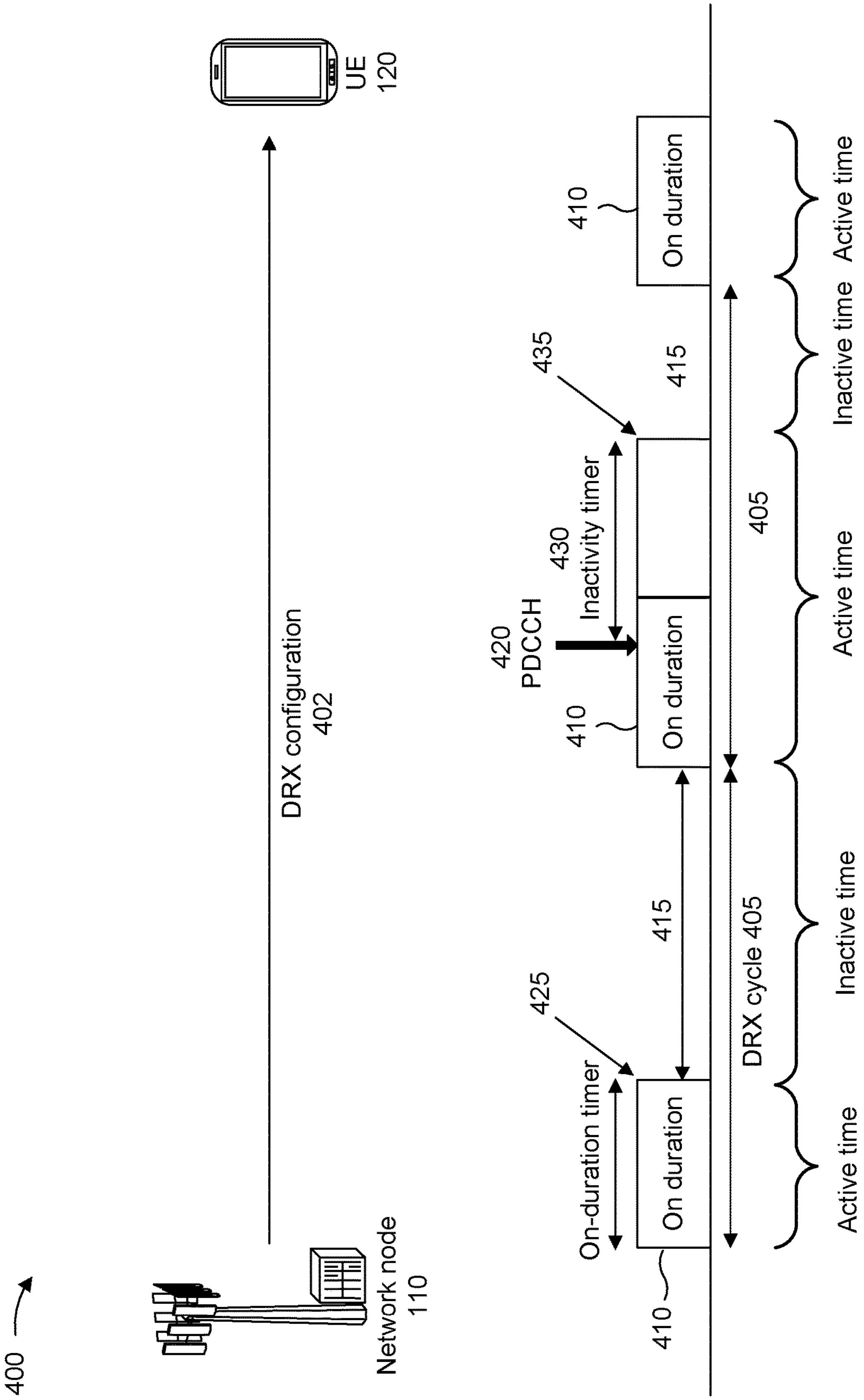
FIG. 4 is a diagram illustrating an example of a discontinuous reception (DRX) configuration, in accordance with the present disclosure.

FIG. 4 is a diagram illustrating an example 400 of a DRX configuration, in accordance with the present disclosure.

As shown in FIG. 4, a network node 110 may transmit a DRX configuration 402 to a UE 120 to configure a DRX cycle 405 for the UE 120. In some cases, the DRX configuration 402 may be a connected mode DRX configuration (C-DRX) that is provided to the UE 120 when the UE 120 is in a connected mode. Furthermore, the DRX configuration 402 may be specific to the UE 120 (for example, the network node 110 may configure separate DRX cycles 405 for different UEs 120). As described herein, a DRX cycle 405 may include a DRX on duration 410 (for example, during which a UE 120 is awake or in an active state) and an opportunity to enter a DRX sleep state 415. As used herein, the time during which the UE 120 is configured to be in an active state (for example, during the DRX on duration 410 and any time during which a DRX inactivity timer 430 is running) may be referred to as an active time or a DRX active time, and the time during which the UE 120 is configured to be in the DRX sleep state 415 may be referred to as an inactive time or a DRX inactive time. As described below, the UE 120 may monitor a physical downlink control channel (PDCCH) during the DRX active time, and may refrain from monitoring the PDCCH during the DRX inactive time.

During each of the DRX on durations 410 (for example, the active times), the UE 120 may monitor a downlink control channel (for example, a PDCCH). For example, the UE 120 may monitor the PDCCH for downlink control information (DCI) pertaining to the UE 120. If the UE 120 does not detect and/or successfully decode any PDCCH communications intended for the UE 120 during the DRX on duration 410 (as shown at 425 in FIG. 4), then the UE 120 may enter the sleep state 415 (for example, for the inactive time) at the end of the DRX on duration 410. In this way, the UE 120 may conserve battery power and reduce power consumption. As shown, the DRX cycle 405 may repeat with a configured periodicity according to the DRX configuration.

If the UE 120 detects and/or successfully decodes a PDCCH communication intended for the UE 120 (as shown at 420 in FIG. 4), then the UE 120 may remain in an active state (for example, awake) for the duration of a DRX inactivity timer 430 (for example, which may extend the DRX active time). The UE 120 may start the DRX inactivity timer 430 at a time at which the PDCCH communication is received (for example, in a transmission time interval (TTI) in which the PDCCH communication is received, such as a slot or a subframe). The UE 120 may remain in the active state until the DRX inactivity timer 430 expires (as shown at 435 in FIG. 4), at which time the UE 120 may enter the sleep state 415 (for example, for the DRX inactive time). During the duration of the DRX inactivity timer 430, the UE 120 may continue to monitor for PDCCH communications, may obtain a downlink data communication (for example, on a downlink data channel, such as a physical downlink shared channel (PDSCH)) scheduled by the PDCCH communication, and/or may prepare and/or transmit an uplink communication (for example, on a physical uplink shared channel (PUSCH)) scheduled by the PDCCH communication. The UE 120 may restart the DRX inactivity timer 430 after each detection of a PDCCH communication for the UE 120 for an initial transmission (for example, but not for a retransmission). By operating in this manner, the UE 120 may conserve battery power and reduce power consumption by entering the sleep state 415 during the DRX inactive time.

As indicated above, FIG. 4 is provided as an example. Other examples may differ from what is described with respect to FIG. 4.

Figure 5:
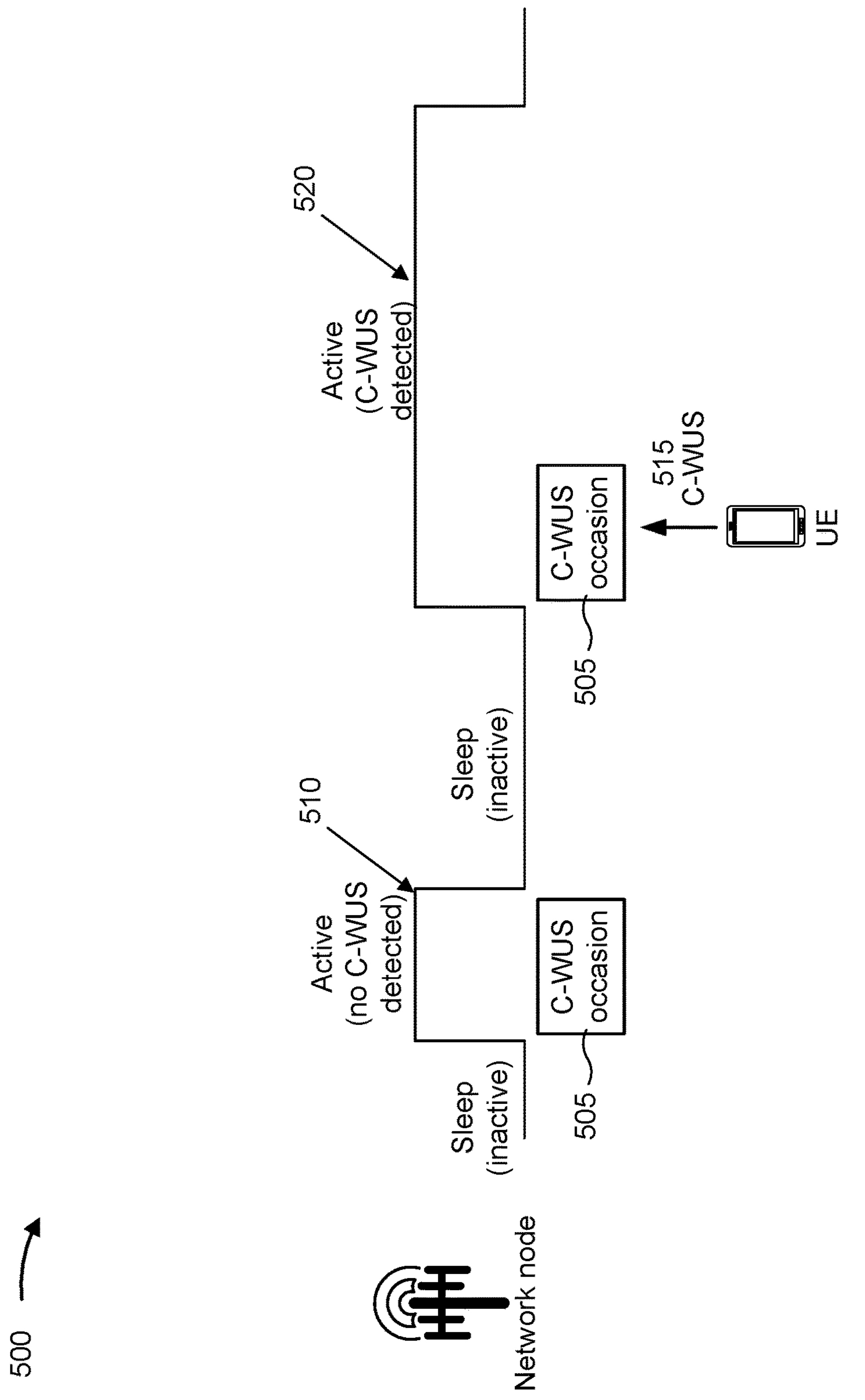
FIG. 5 is a diagram illustrating an example of cell DRX, in accordance with the present disclosure.

FIG. 5 is a diagram illustrating an example 500 of cell DRX, in accordance with the present disclosure.

One potential technique to increase energy efficiency in a RAN may be to enable cell DRX. In some aspects, a network node may transmit (for example, to one or more UEs) a cell DRX configuration to configure a cell DRX cycle. The cell DRX configuration may configure time periods in which a network node does not receive transmissions from UEs in the cell, which allows the network node to enter a sleep state. The cell DRX configuration may configure discontinuous transmission (DTX) for one or more UEs in the cell. The cell DRX configuration may also be referred to as a DTX/DRX configuration or a DTX configuration for a UE. The cell DRX configuration may have similar characteristics as a DRX configuration that may be configured for a UE. For example, the cell DRX cycle may include a cell DRX on duration (or active time), during which the network node is awake and in an active state, and a cell DRX off duration (or inactive time), during which the network node is configured to be in a sleep state. The network node may not transmit or receive channels or signals while in the sleep state. For example, the network node may not receive or monitor for uplink channel communications, random access channel (RACH) communications, or uplink reference signals, among other examples, during the cell DRX inactive time.

In some examples, the cell DRX configuration may be activated during times of the day (for example, off-peak times) in which there is no traffic or a light traffic load in the cell. However, the network node may still be required to periodically broadcast signals and/or channels, such as SSBs and system information (SI). Furthermore, the network node may still need to periodically monitor PRACH occasions for possible RACH or small data transmission (SDT) from a UE that is not is an RRC connected mode. All such periodic transmission and monitoring requires the network node to be in the active state, and thus limits network power savings that can be achieved from cell DRX. In some examples, if the network node knows that there are no connected UEs or a light traffic load in the cell, the network node may stop or slow down periodic transmission and/or periodic monitoring to achieve network power savings. However, in some cases, the network node may not be aware of whether one or more UEs need to switch to a connected state (for example, RRC connected mode) or perform some SDT so the network node can transition to the active state. In some aspects, such UEs may proactively wake up the network node by sending a C-WUS. The C-WUS may be a physical layer signal, such as a PRACH or scheduling request (SR).

As shown in FIG. 5, the cell DRX cycle may be configured with periodic C-WUS monitoring occasions 505 that are aligned with cell DRX on durations. The network node may switch to the active state to monitor for a C-WUS during each C-WUS monitoring occasion 505. If the network node does not detect a C-WUS during a C-WUS monitoring occasion 505 (as shown at 510 in FIG. 5), the network node may enter the sleep state (for example, for the inactive time or cell DRX off duration) at the end of the C-WUS monitoring occasion 505. A UE may transmit a C-WUS 515 to the network node during this C-WUS monitoring occasion 505. For example, and as shown in FIG. 5, the network node may leave the sleep state at the start of the next C-WUS monitoring occasion 505. If the network node detects the C-WUS 515 during the C-WUS monitoring occasion 505 (as shown at 520 in FIG. 5), the network node may remain in the active state after the C-WUS monitoring occasion 505. For example, the network node may remain in the active state for the duration of a timer (for example, a cell DRX inactivity timer), thereby extending the cell DRX active time. The network node may communicate with the UE that transmitted the C-WUS 515 while the network node is in the active state. For example, the network node may transmit SSBs, a SIB1, and/or serve the UE for uplink data reception, among other examples.

As indicated above, FIG. 5 is provided as an example. Other examples may differ from what is described with respect to FIG. 5.

Figure 6A:
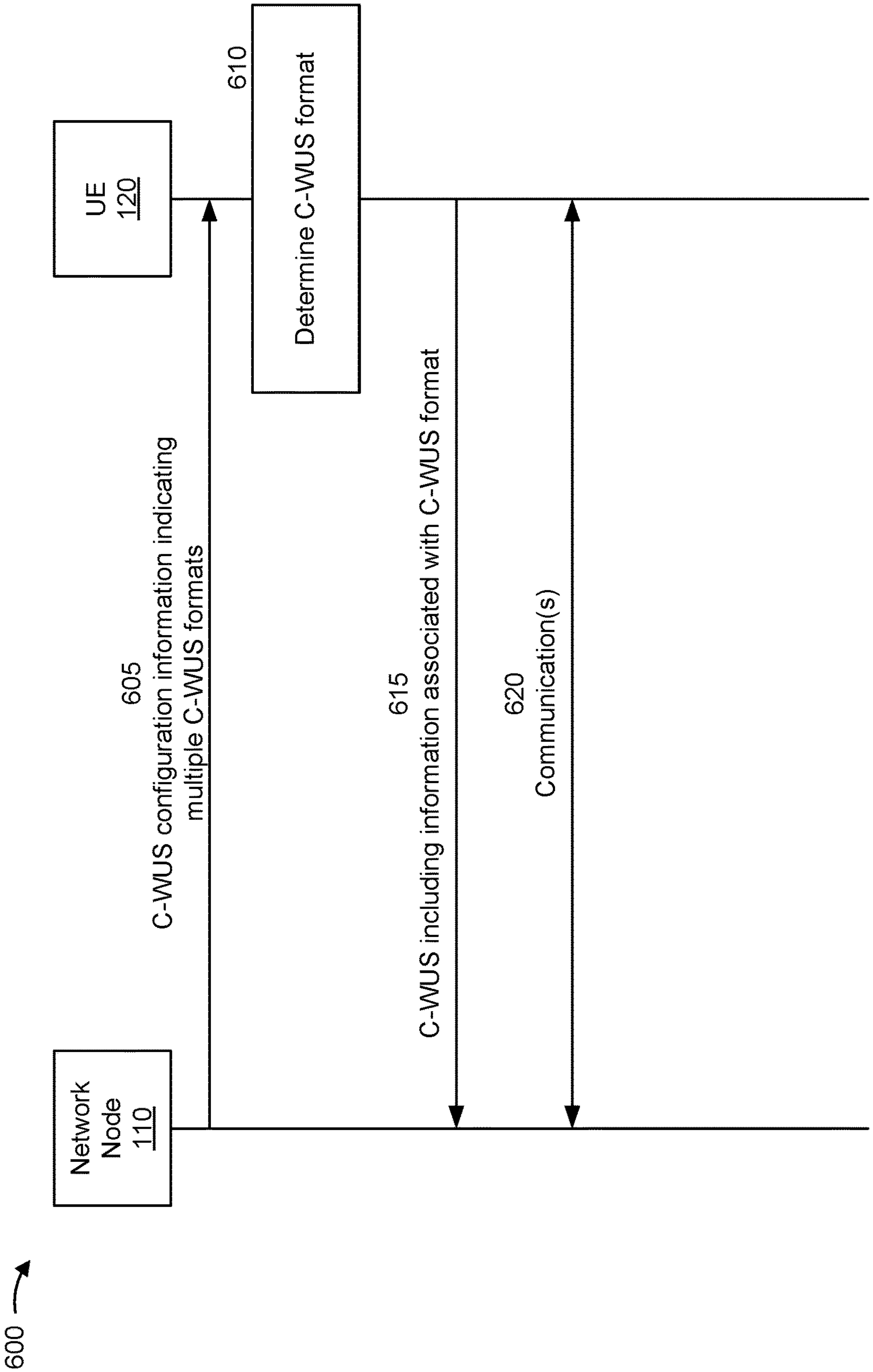
FIGS. 6A-6C are diagrams illustrating an example associated with cell wake-up signal (C-WUS) formats and contents for network energy savings, in accordance with the present disclosure.
Figure 6B:
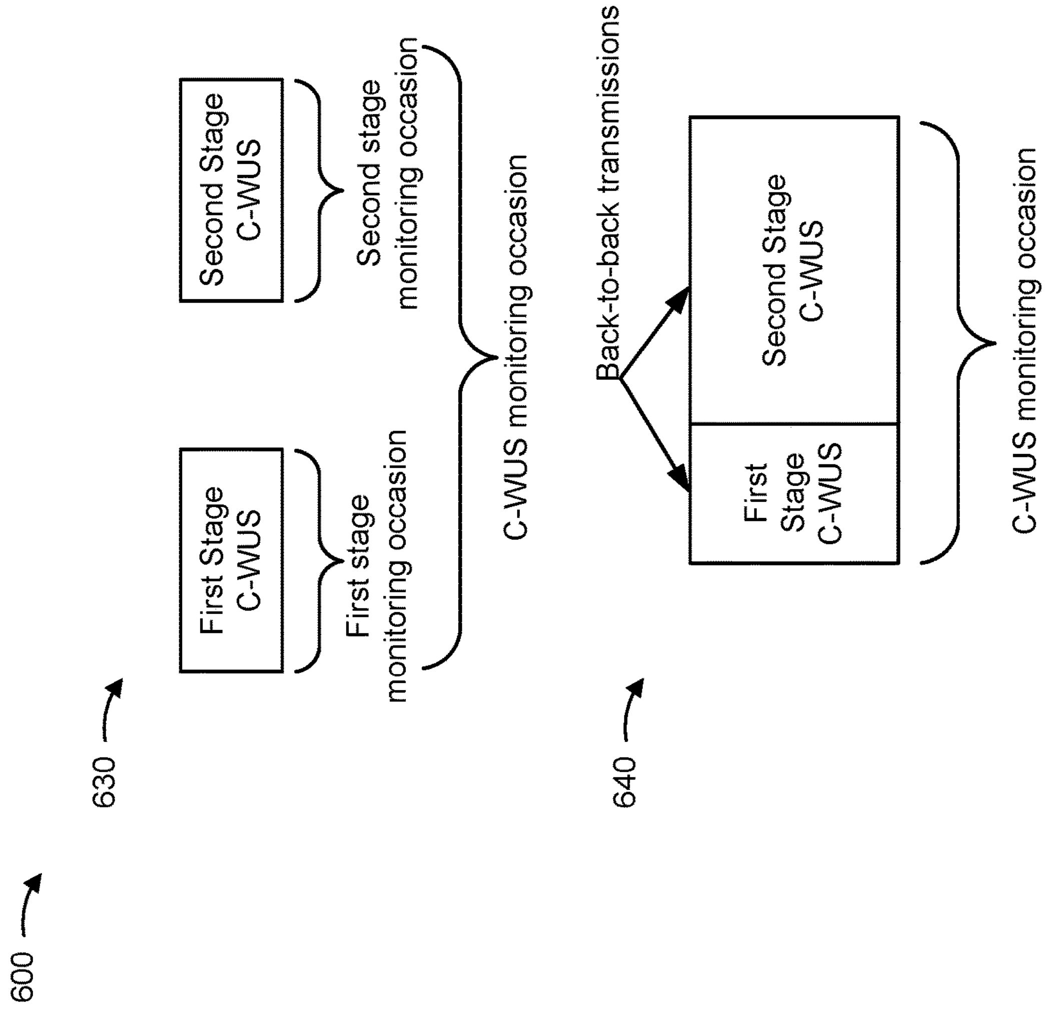
Figure 6C:
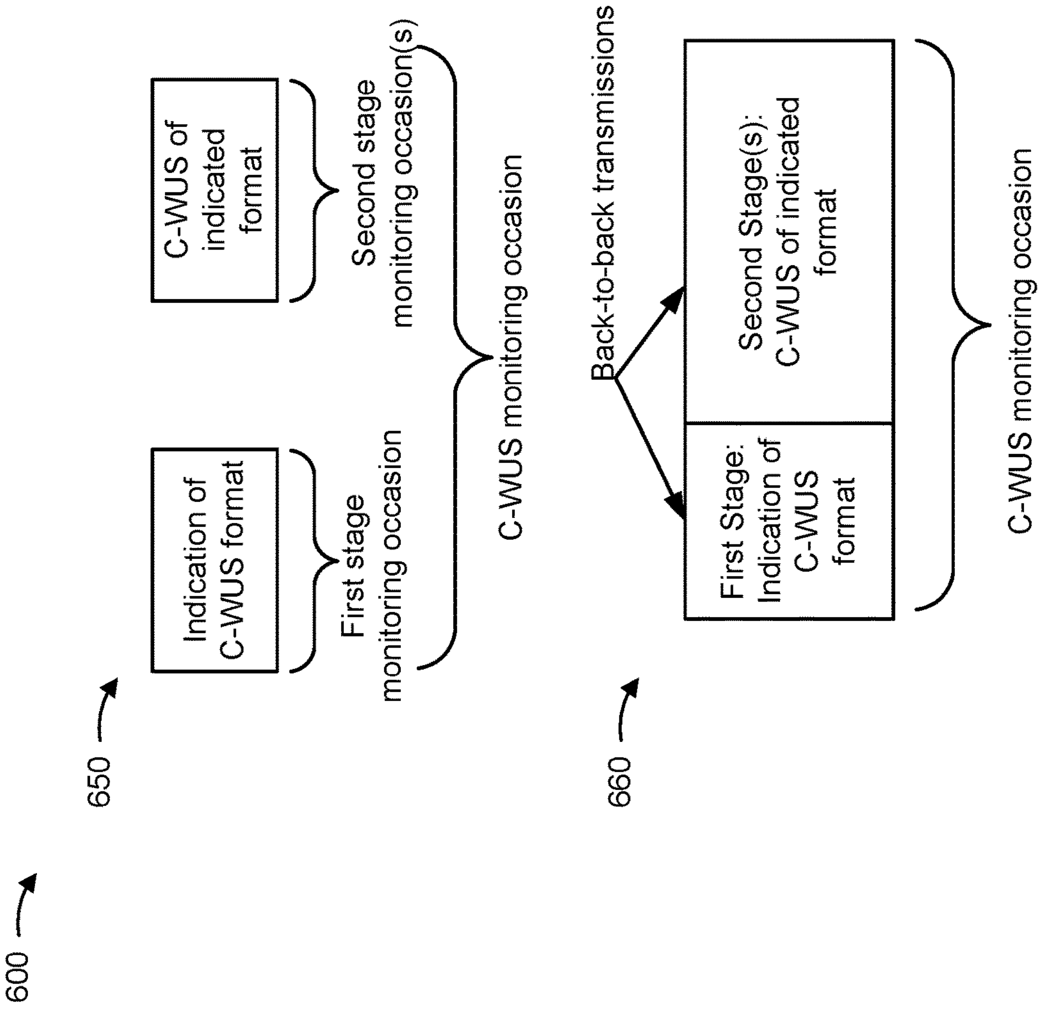

FIGS. 6A-6C are diagrams illustrating an example 600 associated with C-WUS formats and contents for network energy savings, in accordance with the present disclosure. As shown in FIG. 6A, example 600 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 6A, and by reference number 605, the network node 110 may transmit, and the UE 120 may receive, C-WUS configuration information. The C-WUS configuration information may indicate multiple C-WUS formats for a C-WUS to be transmitted to wake up the network node 110 from a sleep state, such as a sleep state associated with a cell DRX cycle. A C-WUS format is a format to be used by a UE (e.g., the UE 120) for transmitting a C-WUS to wake up the network node 110 from a sleep state. A C-WUS may include a C-WUS sequence that indicates that the network node is to wake up from the sleep state and one or more bits of information transmitted in addition to the C-WUS sequence. Different C-WUS formats may correspond to different information to be included in a C-WUS transmissions, in addition to the C-WUS sequence. In some aspects, each C-WUS format, of the multiple C-WUS formats, may be associated with respective information (e.g., a respective set of information) to be included or indicated in a C-WUS associated with that C-WUS format. For example, the information to be included or indicated in a C-WUS associated with a certain C-WUS format may include information relating to uplink traffic in an uplink buffer of the UE 120, uplink and/or sidelink traffic statistics associated with the UE 120, a scheduling request for a sidelink communication, a SIB1 request, information relating to a positioning or sensing procedure, a channel state information (CSI) report, an energy request associated with energy harvesting, information associated with a WUR of the UE 120 and/or LP-WUS transmission by the network node 110, information associated with configured grant (CG) uplink communications and/or semi-persistent scheduling (SPS) downlink communications, a preferred DRX configuration and/or a preferred DTX configuration, a requested uplink transport block size (TBS) and/or a requested downlink TBS, an indication of an SSB index selected by the UE 120, or a combination thereof. In some aspects, the C-WUS configuration information may indicate the respective information (e.g., the respective set of information) associated with each C-WUS format.

In some aspects, the network node 110 may transmit the C-WUS configuration information via layer 3 (L3), layer 2 (L2), or layer 1 (L1) signaling (for example, in an RRC message, a MAC control element (MAC-CE), or DCI, respectively) to the UE 120 or to a group of UEs including the UE 120. In such examples, the network node 110 may separately signal the C-WUS configuration information to each UE or group of UEs in the cell. In some aspects, the network node 110 may broadcast the C-WUS configuration information to UEs in the cell using L1, L2, or L3 signaling. For example, the C-WUS configuration information may be included in an SIB1, a MIB, one or more other SIBs, or a combination thereof (for example, a combination of the MIB and the SIB1). In some aspects, the C-WUS configuration information (or a portion of the C-WUS configuration information) may be indicated in a MIB included in a simplified version of an SSB (e.g., the first SSB described in connection with FIG. 7) associated with a certain NES of the network node 110, as discussed elsewhere herein.

In some aspects, the C-WUS may be a sequence (for example, a baseband sequence) transmitted by a UE (e.g., the UE 120) to wake up the network node 110 from a sleep state. In some aspects, the C-WUS may be a sequence transmitted via a physical uplink control channel (PUCCH). For example, the sequence may be transmitted via a PUCCH format 0 communication. In some aspects, a C-WUS associated with a certain C-WUS format may include a sequence transmitted together with a payload that includes the respective information associated with that C-WUS format. In some aspects, a cell-specific sequence may be configured (e.g., indicated in the C-WUS configuration information) for the C-WUS. In this case, C-WUSs associated with different C-WUS formats may include the cell-specific sequence transmitted with different payloads (e.g., different bits representing different sets of information). In some aspects, different C-WUS formats may be associated with different sequences. For example, the C-WUS configuration information may indicate different sequences and/or different cyclic shifts (CSs) for different C-WUS formats of the multiple C-WUS formats.

In some aspects, the C-WUS configuration information may indicate one or more C-WUS monitoring occasions. The C-WUS monitoring occasions may correspond to active times in a cell DRX cycle, during which the network node 110 may switch from a sleep state to an active state to monitor for C-WUS transmissions. The C-WUS configuration information may indicate respective C-WUS resources associated with each of one or more C-WUS monitoring occasions. In some aspects, different C-WUS monitoring occasions may be configured for different C-WUS formats of the multiple C-WUS formats. In some other aspects, the same configured C-WUS monitoring occasions may be used by the UE 120 to transmit a C-WUS associated with any C-WUS format. In some aspects, one or more of the C-WUS formats may be associated with multi-stage C-WUS transmission. In this case, each C-WUS monitoring occasion configured for a multi-stage C-WUS transmission may include respective monitoring occasions for each of multiple stages in the multi-stage C-WUS transmission. For example, a C-WUS monitoring occasion may include a first stage monitoring occasion associated with a first stage of the C-WUS transmission and a second stage monitoring occasion associated with a second stage of the C-WUS transmission.

In some aspects, the C-WUS configuration information may indicate one or more C-WUS triggering conditions that trigger the UE 120 to transmit the C-WUS in a C-WUS monitoring occasion. For example, the one or more triggering conditions may include at least one of an uplink buffer status report (BSR) threshold, an uplink delay status report (DSR) threshold, an energy level threshold, a charging rate threshold, or a discharging rate threshold, among other examples.

In some aspects, the C-WUS configuration information may indicate the multiple C-WUS formats, and each C-WUS format of the multiple C-WUS formats may be associated with a respective set of information. For example, each C-WUS format may be configured with a set of information bits to indicate the respective set of information. In some aspects, the respective set of information associated with each C-WUS format includes information bits in addition to the C-WUS sequence associated with indicating that the network node 110 is to wake up from the sleep state and remain in the active state. In some aspects, the C-WUS configuration information may indicate the respective set of information associated with each C-WUS format. That is, the C-WUS configuration information may indicate, for each C-WUS format, which information bits are to be included in a C-WUS associated with that C-WUS format. Examples of different information that may be associated with one or more different C-WUS formats are described in greater detail in connection with reference number 615. In some aspects, the different sets of information associated with the different C-WUS formats may include different combinations of the information discussed in connection with reference number 615

As further shown in FIG. 6A, and by reference number 610, the UE 120 may determine a C-WUS format, of the multiple C-WUS formats indicated in the C-WUS configuration information, for a C-WUS to be transmitted by the UE 120. In some aspects, the UE 120 may be configured (e.g., by the network node 110) to use a certain C-WUS format of the multiple C-WUS formats. For example, the network node 110 may transmit, and the UE 120 may receive, an indication of a C-WUS format of the multiple C-WUS formats indicated in the C-WUS configuration information. For example, the network node 110 may transmit the indication of the C-WUS format to the UE 120 or a group of UEs including the UE 120 (or broadcast the indication of the C-WUS format to all UEs in the cell) via L1, L2, or L3 signaling (e.g., via an RRC message, a MAC-CE, or DCI).

In some other aspects, the UE 120 may select the C-WUS format, from the multiple C-WUS formats indicated in the C-WUS configuration information, for the C-WUS to be transmitted by the UE 120. For example, the UE 120 may select the C-WUS format based at least in part on the respective set of information associated with the C-WUS format. That is, the UE 120 may select information to transmit with the C-WUS transmission, and the UE 120 may select the C-WUS format, from the multiple C-WUS formats, for which the respective set of information includes the selected information to be transmitted with the C-WUS transmission. For example, in a case in which an uplink buffer of the UE 120 includes uplink traffic to be transmitted by the UE 120, the UE 120 may determine to transmit information relating to the uplink traffic, such as a BSR and/or a DSR, with the C-WUS transmission. In such an examples, the UE 120 may select, from the multiple C-WUS formats indicated in the C-WUS configuration information, a C-WUS format that includes bits for indicating the BSR and/or the DSR associated with the uplink traffic in the uplink buffer of the UE 120.

As further shown in FIG. 6A, and by reference number 615, the UE 120 may transmit a C-WUS, and the C-WUS may include the respective information associated with the C-WUS format. The network node 110 may receive the C-WUS, including the respective information associated with the C-WUS format, transmitted by the UE 120. In some aspects, the UE 120 may transmit the C-WUS in a C-WUS monitoring occasion (e.g., a C-WUS monitoring occasion of one or more C-WUS monitoring occasions indicated in the C-WUS configuration information). In some aspects, the network node 110 may switch from a sleep state to an active state to monitor the C-WUS monitoring occasions, and the network node 110 may receive the C-WUS based at least in part on monitoring the C-WUS monitoring occasions. In some aspects, the C-WUS may be associated with a C-WUS format indicated from the network node 110, e.g., indicated at 605. In some other aspects, the C-WUS may be associated with a C-WUS format selected by the UE 120.

In some aspects, the UE 120 may transmit the C-WUS based at least in part on uplink traffic (or sidelink traffic) to be transmitted by the UE 120 arriving in an uplink buffer (or a sidelink buffer) of the UE 120. For example, the UE 120 may transmit the C-WUS after the uplink traffic (or sidelink traffic) has arrived in the uplink buffer (or the sidelink buffer). In some aspects, the UE 120 may transmit the C-WUS in connection with a determination that a triggering condition for transmitting the C-WUS is satisfied. In some examples, the triggering condition may be satisfied in connection with a size of an uplink buffer (e.g., a size or amount of uplink data to be transmitted by the UE 120) satisfying a BSR threshold. For example, the UE 120 may transmit the C-WUS once the uplink buffer is greater than or equal to the BSR threshold. In some examples, the UE 120 may generate a DSR that indicates a waiting time ($T_{wait}$) for packets in the uplink buffer of the UE 120 and the remaining packet delay budget (PDB) for the packets in the uplink buffer of the UE 120. In this case, the triggering condition may be satisfied in connection with a determination that the waiting time ($T_{wait}$), or a comparison of the waiting time ($T_{wait}$) and the PDB, satisfies a DSR threshold (e.g., equals or is greater than a DSR threshold). In some examples, the triggering condition may be satisfied based at least in part on an energy level (e.g., a power level) of the UE 120 satisfying an energy level threshold (e.g., the energy level equaling or being greater than the energy level threshold). In some examples, the triggering condition may be satisfied based at least in part on a charging rate of the UE 120 satisfying a charging rate threshold (e.g., the charging rate failing to exceed the charging rate threshold). In some examples, the triggering condition may be satisfied based at least in part on a discharging rate of the UE 120 satisfying a discharging rate threshold (e.g., the discharging rate equaling or being greater than the discharging rate threshold).

In some aspects, the UE 120 may transmit the C-WUS in multiple stages. In some aspects, the information included in the C-WUS (e.g., the respective set of information associated with the C-WUS format of the C-WUS) may be transmitted over multiple C-WUS transmissions in the multiple stages. For example, as shown in FIG. 6B, the UE 120 may transmit, in a first stage, a first stage C-WUS including first information of the set of information associated with the C-WUS format, and the UE 120 may transmit, in a second stage, a second stage C-WUS including second information of the set of information associated with the C-WUS format. As shown by reference number 630, in some aspects, the UE 120 may transmit the first stage C-WUS in a first stage monitoring occasion of a C-WUS monitoring occasion, and the UE 120 may transmit the second stage C-WUS in a second stage monitoring occasion of the C-WUS monitoring occasion. In this case, the network node 110 may monitor the first stage monitoring occasion.

If the network node 110 receives the first stage C-WUS in the first stage monitoring occasion, the network node 110 may then monitor the second stage monitoring occasion to receive the second stage C-WUS. If the network node 110 does not receive the first stage C-WUS in the first stage monitoring occasion, the network node 110 may refrain from monitoring the second stage monitoring occasion, which may allow the network node 110 to return to a sleep state prior to an end of the C-WUS monitoring occasion, and thus may increase network energy savings. As shown by reference number 640, in some aspects, the UE 120 may transmit the first stage C-WUS and the second stage C-WUS in back-to-back transmissions (e.g., in consecutive slots and/or symbols) in a C-WUS monitoring occasion. Although FIG. 6B shows examples including a first stage C-WUS and a second stage C-WUS, in some other examples, the UE 120 may transmit the C-WUS and the information associated with the C-WUS format in a single stage or in three or more stages.

In some aspects, as shown in FIG. 6C, the UE 120 may transmit, in a first stage, an indication of the C-WUS format associated with the C-WUS, and the UE 120 may transmit, in a second stage (or multiple second stages), the C-WUS including the information associated with the C-WUS format. In some aspects, the UE 120 may select the C-WUS format from the multiple C-WUS formats indicated in the C-WUS configuration information, and the UE 120 may indicate, to the network node 110, the C-WUS format selected by the UE 120 via the first stage indication of the C-WUS format. In some aspects, the indication of the C-WUS format transmitted in the first stage may be uplink control information (UCI) indicating the C-WUS format. For example, the UCI may include one bit that indicates a selected C-WUS format of two possible C-WUS formats at a certain time or a certain NES. In this case, the C-WUS configuration information may configure, for different times or NESs, sets of two C-WUS formats that can be used at each time or for each NES, and the UE 120 may select the C-WUS format from the set of two C-WUS formats configured for the current time or NES. In some other examples, the first stage C-WUS format indication may include multiple bits, to enable the UE 120 to indicate a C-WUS format selection from a larger quantity of C-WUS formats. In some aspects, the second stage may include a single second stage for transmitting the C-WUS including the information associated with the C-WUS format, or multiple second stages for transmitting C-WUSs including respective portions of the information associated with the C-WUS format (e.g., similar to the first and second C-WUSs transmitted in the first and second stages shown in FIG. 6B).

As show by reference number 650, in some aspects, the UE 120 may transmit the indication of the C-WUS format in a first stage monitoring occasion of a C-WUS monitoring occasion, and the UE 120 may transmit the C-WUS including the information associated with the C-WUS format in a second stage monitoring occasion (or multiple second stage monitoring occasions) of the C-WUS monitoring occasion. In this case, the network node 110 may monitor the first stage monitoring occasion. If the network node 110 receives the indication of the C-WUS format in the first stage monitoring occasion, the network node 110 may then monitor the second stage monitoring occasion to receive the C-WUS and the information associated with the C-WUS format. If the network node 110 does not receive the indication of the C-WUS format in the first stage monitoring occasion, the network node 110 may refrain from monitoring the second stage monitoring occasion, which may allow the network node 110 to return to a sleep state prior to an end of the C-WUS monitoring occasion, and thus may increase network energy savings. As shown by reference number 660, in some aspects, the UE 120 may transmit the indication of the C-WUS format in the first stage and the C-WUS including the information associated with the C-WUS format in the second stage (or in multiple second stages) in back-to-back transmissions (e.g., in consecutive slots and/or symbols) in a C-WUS monitoring occasion.

In some aspects, the information associated with the C-WUS format and included in the C-WUS (e.g., transmitted in one or more stages) may include information relating to uplink traffic in an uplink buffer of a UE 120. For example, the information associated with the C-WUS format may include an uplink BSR and/or an uplink DSR. Additionally, or alternatively, the information associated with the C-WUS format may include a low-resolution indication associated with the BSR or the DSR. For example, the information associated with the C-WUS format may include an indication (e.g., a one bit indication) of whether a threshold associated with the BSR is satisfied (e.g., a size of the uplink buffer satisfies the threshold associated with the BSR) and/or an indication (e.g., a one bit indication) of whether a threshold associated with the DSR is satisfied (e.g., whether a waiting time, a remaining PDB, or a comparison of the waiting time and the remaining PDB satisfies the threshold associated with the DSR). In this case, the threshold associated with the BSR and/or the threshold associated with the DSR may be based at least in part on configuration information received from the network node 110 (e.g., indicated in the C-WUS configuration information or other configuration information), an NES of the network node 110, or an energy state (or power state) of the UE 120.

In some aspects, the information associated with the C-WUS format and included in the C-WUS may include uplink and/or sidelink traffic statistics including one or more traffic types for uplink and/or sidelink traffic or one or more logical channel group (LCG) identifiers (IDs) corresponding to one or more LCGs associated with the uplink and/or sidelink traffic. For example, the information associated with the C-WUS format may include at least one of an indication of one or more traffic types associated with uplink or sidelink packets to be transmitted by the UE 120 or an indication of one or more LCG IDs associated with the uplink or sidelink packets to be transmitted by the UE 120. Additionally, or alternatively, the information associated with the C-WUS format and included in the C-WUS may include timing information associated with the uplink and/or sidelink traffic. For example, the timing information may include at least one of an indication of a remaining PDB associated with a highest priority packet of the uplink or sidelink traffics to be transmitted by the UE 120, an indication of a minimum remaining PDB across all of the uplink or sidelink packets to be transmitted by the UE 120, or an indication of a highest priority associated with the uplink or sidelink packets to be transmitted by the UE 120.

In some aspects, the information associated with the C-WUS format and included in the C-WUS may include a scheduling request for a sidelink communication. For example, the information associated with the C-WUS format may include a bit field for indicating whether the UE 120 requests a sidelink scheduling request, and the UE 120 may indicate, in the bit field, a bit value associated with requesting a sidelink scheduling request.

In some aspects, the information associated with the C-WUS format and included in the C-WUS may include a SIB1 request and an indication of a time offset associated with the SIB1 request. For example, the time offset associated with the SIB1 request may be a minimum time offset between the C-WUS transmission and the transmission of the SIB1 by the network node 110. In some examples, in a case in which the UE 120 is an energy harvesting device that charges by harvesting energy from RF signals transmitted by the network node 110, the UE 120 may indicate the minimum time offset, between the C-WUS transmission and the transmission of the SIB1, based at least in part on an amount of time for the UE 120 (or another energy harvesting device) to charge before receiving the SIB 1.

In some aspects, the information associated with the C-WUS format and included in the C-WUS may include information relating to a positioning or sensing procedure. For example, information included in the C-WUS may include an indication of a positioning or sensing request. In some examples, the information included in the C-WUS may further include an indication of a time offset associated with the positioning or sensing request. For example, the time offset associated with the positioning or sensing request may be a time offset between the C-WUS transmission and a requested start time for a positioning or sensing procedure associated with the positioning or sensing request. Additionally, or alternatively, the information included in the C-WUS may further include (e.g., in addition to an indication of a positioning or sensing request) an indication of at least one of a priority or a latency (e.g., a latency requirement) associated with the positioning or sensing request.

In some aspects, the information associated with the C-WUS format and included in the C-WUS may include at least one of a CSI report for a Uu link (e.g., a link between the network node 110 and the UE 120) or a CSI report for a sidelink (e.g., between the UE 120 and another UE). In this case, the UE 120 may buffer the CSI report(s) (e.g., for the Uu link and/or the sidelink) until the C-WUS transmission time (e.g., in the C-WUS monitoring occasion). In some aspects, the information associated with the C-WUS format and included in the C-WUS may include a power headroom report (PHR) that indicates a PHR associated with the UE 120.

In some aspects, the information associated with the C-WUS format and included in the C-WUS may include an energy request associated with energy harvesting to be performed by the UE 120. For example, in a case in which the UE 120 is an energy harvesting device and the network node 110 supports wireless energy transfer, the UE 120 may indicate, in the information associated with the C-WUS format, a request for transmission, by the network node 110, of a signal to be used for energy harvesting by the UE 120.

In some aspects, the information associated with the C-WUS format and included in the C-WUS may include information associated with a WUR of the UE 120 and/or LP-WUS transmission by the network node 110. For example, the information associated with the C-WUS format may include an indication of a configuration of an LP-WUS associated with a WUR of the UE 120. In this case, the indication of the configuration of the LP-WUS may indicate a selected configuration (e.g., from multiple LP-WUS configurations) of the LP-WUS to be transmitted by the network node 110 and received by the WUR (e.g., a low power WUR) of the UE 120 to wake up a main radio (MR) of the UE 120 from a sleep state to an active state. Additionally, or alternatively, the information associated with the C-WUS format may include an activation indication associated with a LP-WUS. For example, the activation indication may activate an LP-WUS so that the network node 110 transmits the LP-WUS based on LP-WUS compatibility of the WUR of the UE 120. In some examples, the information associated with the C-WUS format may include configurations for one or more low power synchronization signals (LP-SSs) associated with synchronizing the WUR of the UE 120 (e.g., synchronizing the LP-WUS to be received by the WUR of the UE 120). Additionally, or alternatively, the information associated with the C-WUS format may include configurations for one or more low power reference signals (LP-RSs) for radio resource management (RRM) measurements performed by the WUR of the UE 120 and/or configurations for one or more preamble signals associated with the WUR of the UE 120. In some examples, the information associated with the C-WUS format may include an indication of whether the LP-WUS to be transmitted by the network node 110 supports SSB configuration for the UE 120.

In some aspects, the information associated with the C-WUS format and included in the C-WUS may include information associated with CG uplink communications and/or SPS downlink communications. For example, the information associated with the C-WUS format may include an indication of one or more preferred CG configurations for the UE 120 and/or an indication of one or more preferred SPS configurations for the UE 120. In this case, the information associated with the C-WUS format may indicate a preferred CG configuration or a template of best (e.g., preferred) CG configurations, and/or the information associated with the C-WUS format may indicate a preferred SPS configuration or a template of best (e.g., preferred) SPS configurations. Additionally, or alternatively, the information associated with the C-WUS format may include an activation indication associated with one or more CG configurations (e.g., indicating activation of one or more CG configurations) and/or an activation indication associated with one or more SPS configurations (e.g., indicating activation of one or more SPS configurations).

In some aspects, the information associated with the C-WUS format and included in the C-WUS may include an indication of at least one of a preferred DRX configuration or a preferred DTX configuration. In some aspects, the information associated with the C-WUS format and included in the C-WUS may include at least one of a preferred uplink reference signal configuration (e.g., sounding reference signal (SRS) configuration) or an indication of a preferred downlink reference signal configuration (e.g., CSI reference signal (CSI-RS) configuration). In some aspects, the information associated with the C-WUS format and included in the C-WUS may include uplink jitter information (e.g., in a case in which the uplink jitter information is known at the UE 120). In some aspects, the information associated with the C-WUS format and included in the C-WUS may include UE energy information. For example, the UE energy information may include information relating to an energy state of the UE 120, such as a current energy state of the UE 120 and/or a next energy state of the UE 120. Additionally, or alternatively, the UE energy information may include other energy information associated with the UE 120, such as a charging rate profile of the UE 120, a discharging rate profile of the UE 120, and/or an energy level profile of the UE 120.

In some aspects, the information associated with the C-WUS format and included in the C-WUS may include at least one of an indication of a requested uplink TBS for uplink communications to be transmitted by the UE 120 or an indication of a requested downlink TBS for downlink communications to be transmitted to the UE 120. Additionally, or alternatively, the information associated with the C-WUS format and included in the C-WUS may include an indication of a maximum amount of downlink traffic supported by the UE 120 in a certain time period following the C-WUS transmission. For example, the UE 120 may indicate the maximum amount of downlink traffic that the UE 120 may receive and decode in the time period while also performing energy harvesting from the signals transmitted by the network node 110 during the time period.

In some aspects, the information associated with the C-WUS format and included in the C-WUS may include an indication of an SSB index selected by the UE 120. For example, the UE 120 may change an SSB index (e.g., based on SSB measurements performed by the UE 120), from a previously indicated SSB index, prior to transmitting the C-WUS (e.g., prior to the DRX active time of the network node 110). In this case, the UE 120 may select a new SSB index, as compared to a latest SSB index indicated by the UE 120, and the UE 120 may indicate the selected SSB index in the information included in the C-WUS to inform the network node 110 of the selected SSB index (e.g., and the beam information associated with the selected SSB index). In some aspects, the information associated with the C-WUS format and included in the C-WUS may include an indication of capability of the UE 120. In some examples, the indication of the capability of the UE 120 may indicate a change in the capability of the UE 120 from a previous indicated capability of the UE 120. For example, the capability of the UE 120 may change between a legacy UE and an enhanced reduced capability (cRedCap) UE, among other examples. In some aspects, the information associated with the C-WUS format and included in the C-WUS may include one or more emergency bits associated with emergency information.

Returning to FIG. 6A, and as shown by reference number 620, the UE 120 and the network node 110 may communicate based at least in part on the C-WUS and the information associated with the C-WUS format and included in the C-WUS. The network node 110 may switch to (or remain in) an active state responsive to, based on, or otherwise associated with receiving the C-WUS. The UE 120 may transmit, and the network node 110 may receive, one or more uplink communications while the network node 110 is operating in the active state. Additionally or alternatively, the network node 110 may transmit, and the UE 120 may receive, one or more downlink communications while the network node 110 is operating in the active state. In some examples, the network node may transmit SSBs, a SIB1, and/or serve the UE 120 for uplink data reception, among other examples. In some examples, the network node 110 may transmit, and the UE 120 may receive, a simplified version of an SSB (e.g., the first SSB described in connection with FIG. 7) associated with a NES of the network node 110, based at least in part on the network node 110 receiving the C-WUS. In some examples, the UE 120 may communicate with the network node 110 (for example, via one or more RACH communications) to establish an RRC connection with the network node 110.

In some aspects, the network node 110 may transmit the SIB1 based at least in part on the C-WUS and the information included in the C-WUS. The UE 120 may receive the SIB 1 transmitted by the UE 120. In some examples, the network node 110 may transmit the SIB 1 based at least in part on information indicated in the C-WUS, such as a SIB1 request and a time offset associated with the SIB request (e.g., a minimum time offset between the C-WUS and the SIB1 transmission). For example, the network node 110 may transmit the SIB 1 after the minimum time offset indicated in the information included in the C-WUS. In some aspects, the network node 110 may transmit, and the UE 120 may receive, one or more downlink communications based at least in part on the information included in the C-WUS. In some examples, the network node 110 may transmit, and the UE 120 may receive, one or more SPS downlink communications based at least in part on information included in the C-WUS, such as information indicating one or more preferred SPS configurations and/or activating one or more SPS configurations. In some aspects, the network node 110 may transmit one or more downlink signals, and the UE 120 may perform energy harvesting using the one or more downlink signals, based at least in part on information included in the C-WUS, such as an energy request and/or a maximum amount of downlink traffic supported by the UE 120 in a time period subsequent to the C-WUS transmission.

In some aspects, the network node 110 may transmit, and the UE 120 may receive, an uplink grant (e.g., uplink grant DCI transmitted via a PDCCH communication) that schedules one or more uplink communications for the UE 120. In this case, the UE 120 may transmit, and the network node 110 may receive, the one or more uplink communications scheduled by the uplink grant. In some examples, the network node 110 may schedule the one or more uplink communications and/or transmit the uplink grant based at least in part on information included in the C-WUS, such as information and/or uplink traffic statistics relating to uplink traffic in an uplink buffer of the UE 120 (e.g., uplink traffic to be transmitted by the UE 120). In some aspects, the one or more transmission parameters (e.g., MCS, TBS, and/or transmission power, among other examples) for the one or more uplink communications may be based at least in part on information included in the C-WUS, such as a CSI report, a requested uplink TBS, and/or uplink jitter information, among other examples. In some aspects, the UE 120 may transmit uplink data to the network node 110 in one or more CG uplink communications based at least in part on information included in the C-WUS, such as information indicating one or more preferred CG configurations and/or activation of one or more CG configurations.

In some aspects, the network node 110 may transmit, and the UE 120 may receive, sidelink scheduling information that schedules one or more sidelink communications for the UE 120. In this case, the UE 120 may transmit, to one or more other UEs, the one or more sidelink communications scheduled by the sidelink scheduling information. In some examples, the network node 110 may schedule the one or more sidelink communications for the UE 120, determine one or more transmission parameters for the one or more sidelink communications, and/or transmit the sidelink scheduling information based at least in part on the information included in the C-WUS, such as an indication of a scheduling request for a sidelink communication, sidelink traffic statistics associated with sidelink traffic to be transmitted by the UE 120, and/or a sidelink CSI report, among other examples.

In some examples, the network node 110 and the UE 120 may perform communications associated with a positioning or sensing procedure based at least in part on the information included in the C-WUS. For example, the network node 110 and the UE 120 may perform the communications associated with a positioning or sensing procedure based at least in part on an indication of a positioning or sensing request, an indication of a time offset associated with the positioning and sensing request, and/or an indication of a priority or latency (e.g., latency requirement) associated with the positioning and sensing request included in the information included in the C-WUS.

In some aspects, in a case in which the UE 120 includes a WUR for monitoring for an LP-WUS while an MR of the UE 120 is in a sleep state, the network node 110 may transmit the LP-WUS to be received by the WUR of the UE 120 based at least in part on information associated with the LP-WUS that is included in the C-WUS. Additionally, or alternatively, the network node 110 may transmit one or more LP-SSs, one or more LP-RSs, and/or one or more preamble signals associated with the WUR of the UE 120 based at least in part on the information included in the C-WUS.

As indicated above, FIGS. 6A-6C are provided as an example. Other examples may differ from what is described with respect to FIGS. 6A-6C.

Figure 7:
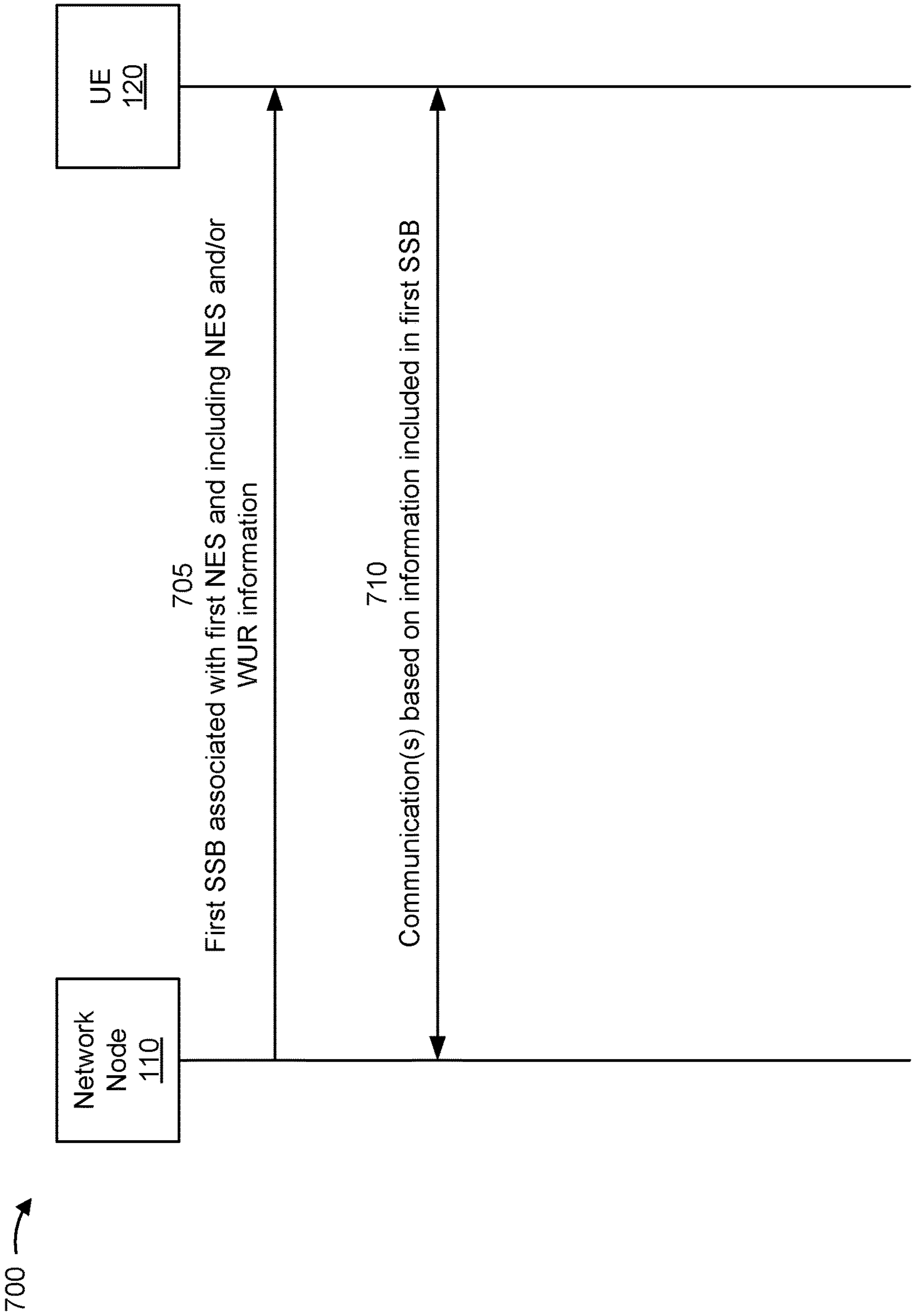
FIG. 7 is a diagram illustrating an example associated with a simplified version of a synchronization signal block (SSB) for network energy savings, in accordance with the present disclosure.

FIG. 7 is a diagram illustrating an example 700 associated with a simplified version of an SSB for network energy savings, in accordance with the present disclosure. As shown in FIG. 7, example 700 includes communication between a network node 110 and a UE 120. In some aspects, the network node 110 and the UE 120 may be included in a wireless network, such as wireless network 100. The network node 110 and the UE 120 may communicate via a wireless access link, which may include an uplink and a downlink.

As shown in FIG. 7, and by reference number 705, the network node 110 may transmit, and the UE 120 may receive, a first SSB associated with a first NES of the network node 110 and including NES and/or WUR information. In some aspects, the network node 110 may transmit the first SSB associated with the first NES while the network node 110 is operating in the first NES. The network node 110 may transmit different SSBs while operating in different NESs. For example, the network node 110 may transmit the first SSB associated with the first NES while the network node 110 is operating in the first NES, and the network node 110 may transmit a second SSB associated with a second NES while the network node 110 is operating in the second NES. The first SSB associated with the first NES may include a first MIB indicating first information, the second SSB associated with the second NES may include a second MIB indicating second information, and the first information indicated in the first MIB may be different from the second information indicated in the second MIB. In some aspects, the first SSB may be a simplified version of an SSB. For example, the first NES may be associated with reduced network energy consumption, as compared to the second NES, and the first SSB associated with the first NES may be a simplified version of the second SSB associated with the second NES. In this case, the first information indicated in the first MIB of the first SSB may include a reduced amount of information, as compared to the second information indicated in the second MIB of the second SSB. For example, at least a portion of the second information indicated in the second MIB of the second SSB may not be included in the first information indicated in the first MIB of the first SSB.

In some aspects, the first SSB associated with the first NES may include NES information relating to one or more NESs of the network node 110 and/or WUR information associated with WUR support by the network node 110. For example, the first information indicated in the first MIB of the first SSB may include the NES information and/or the WUR information. In some aspects, the first information indicated in the first MIB of the first SSB may include a barring bit. For example, the barring bit may indicate whether a UE (e.g., the UE 120) can camp on a cell associated with the network node 110 (e.g., whether the cell can accept one or more UEs or not). In some aspects, the first information indicated in the first MIB of the first SSB may include one or more emergency bits associated with emergency information. In some aspects, the first information indicated in the first MIB of the first SSB may indicate one or more C-WUS triggering conditions associated with triggering the UE 120 to transmit a C-WUS (e.g., as described in connection with FIGS. 6A-6C). For example, the one or more C-WUS triggering conditions may include at least one of an uplink BSR threshold, an uplink DSR threshold, an energy level threshold, a charging rate threshold, or a discharging rate threshold, among other examples, to be used by the UE 120 to trigger transmission of a C-WUS by the UE 120.

In some aspects, the first information indicated in the first MIB of the first SSB may include an indication of a current NES (e.g., the first NES) of the network node 110 and/or an indication of a remaining time in the current NES for the network node 110 (e.g., in a case the remaining time in the current NES is known to the network node 110). In some examples, the UE 120 may be configured with different RRC configurations associated with different NESs, and the UE 120 may determine which RRC configuration to use based at least in part on the indication of the current NES and/or the time remaining in the current NES. Additionally, or alternatively, the first information indicated in the first MIB of the first SSB may include an indication of a next NES for the network node 110 and/or a pattern of NESs (e.g., different NESs at different times) for the network node 110. In some aspects, multiple SIB1 formats may be configured per NES, and each SIB 1 format may include different contents from the other SIB1 formats. In this case, the first information indicated in the first MIB of the first SSB may include an indication of a SIB1 format of the multiple SIB1 formats associated with the current NES (e.g., the first NES). In some aspects, the first information indicated in the first MIB of the first SSB may include an indication of a system information change. For example, the first information indicated in the first MIB of the first SSB may indicate whether system information has changed within a certain time period, and the UE 120 may obtain the system information in connection with an indication that the system information has changed.

In some aspects, the first information indicated in the first MIB of the first SSB may include an indication of whether the network node 110 supports LP-WUS transmission (e.g., supports WUR-based communication). Additionally, or alternatively, the first information indicated in the first MIB of the first SSB may include an indication of one or more classes of WUR for which the network node 110 supports LP-WUS transmission. For example, the first information indicated in the first MIB of the first SSB may indicate whether the low power signals (e.g., LP-WUSs) used by one or more classes of WUR are supported. In this case, each class of WUR for a UE may be associated with certain signals, waveforms, modulation, interface, sensitivity/coverage, and/or WUS format, among other examples. In some examples, the first information indicated in the first MIB of the first SSB may include, for each of the one or more classes of WUR for which the network node supports LP-WUS transmission, an indication of whether the network node supports transmission of a supported LP-SS, a supported LP-RS, and/or a supported preamble signal associated with the WUR. In some aspects, the indication of WUR support may be based at least in part on the NES of the network node 110. For example, the first information indicated in the first MIB of the first SSB may include an indication of whether the network node 110 supports WUR-based UEs in the current NES (e.g., the first NES) of the network node 110. Additionally, or alternatively, the first information indicated in the first MIB of the first SSB may include an indication of whether WUR-based UEs are barred from using the WUR. In this case, an indication that WUR-based UEs are barred may indicate to a WUR-based UE (e.g., the UE 120) to stop using the WUR.

In some aspects, the first information indicated in the first MIB of the first SSB may include an indication of whether the network node 110 supports one or more energy services and/or reading/communication with passive devices, semi-passive devices, active tags, and/or energy harvesting devices.

As further shown in FIG. 7, and by reference number 710, the UE 120 and the network node 110 may communicate based at least in part on the first SSB. For example, the UE 120 and the network node 110 may communicate based at least in part on the first information indicated in the first MIB of the first SSB. In some examples, the UE 120 may communicate with the network node 110 (for example, via one or more RACH communications) to establish an RRC connection with the network node 110 based at least in part on the first SSB. In some examples, the network node 110 may transmit the SIB1 and/or other SIBs including other system information, and the UE 120 may receive the SIB1 and/or the other SIBs based at least in part on the first information indicated in the first MIB. In some aspects, the network node 110 may transmit, and the UE 120 may receive, one or more downlink communications, and/or the UE 120 may transmit, and the network node 110 may receive one or more uplink communications. In some aspects, the UE 120 may communicate with (e.g., receive downlink communications from and/or transmit uplink communications to) the network node 110 using configuration information (e.g., RRC configuration information) associated with the NES of the network node 110 based at least in part on NES information included in the first information indicated in the first MIB of the first SSB.

In some aspects, the UE 120 may use a WUR of the UE 120 to monitor for an LP-WUS transmission from the network node 110 to wake up an MR of the UE 120 based at least in part on WUR and/or LP-WUS information included in the first information indicated in the first MIB of the first SSB. In this case, the network node 110 may transmit the LP-WUS associated with the WUR of the UE 120 based at least in part on the WUR and/or LP-WUS information included in the first information indicated in the first MIB of the first SSB. In some aspects, the UE 120 may transmit a C-WUS to wake up the network node 110 from a sleep state based at least in part on one or more C-WUS triggering conditions included in the first information indicated in the first MIB of the first SSB. In some aspects, the UE 120 may perform energy harvesting using downlink communications transmitted by the network node 110 based at least in part on an indication of support for energy harvesting included in the first information indicated in the first MIB of the first SSB.

As indicated above, FIG. 7 is provided as an example. Other examples may differ from what is described with respect to FIG. 7.

Figure 8:
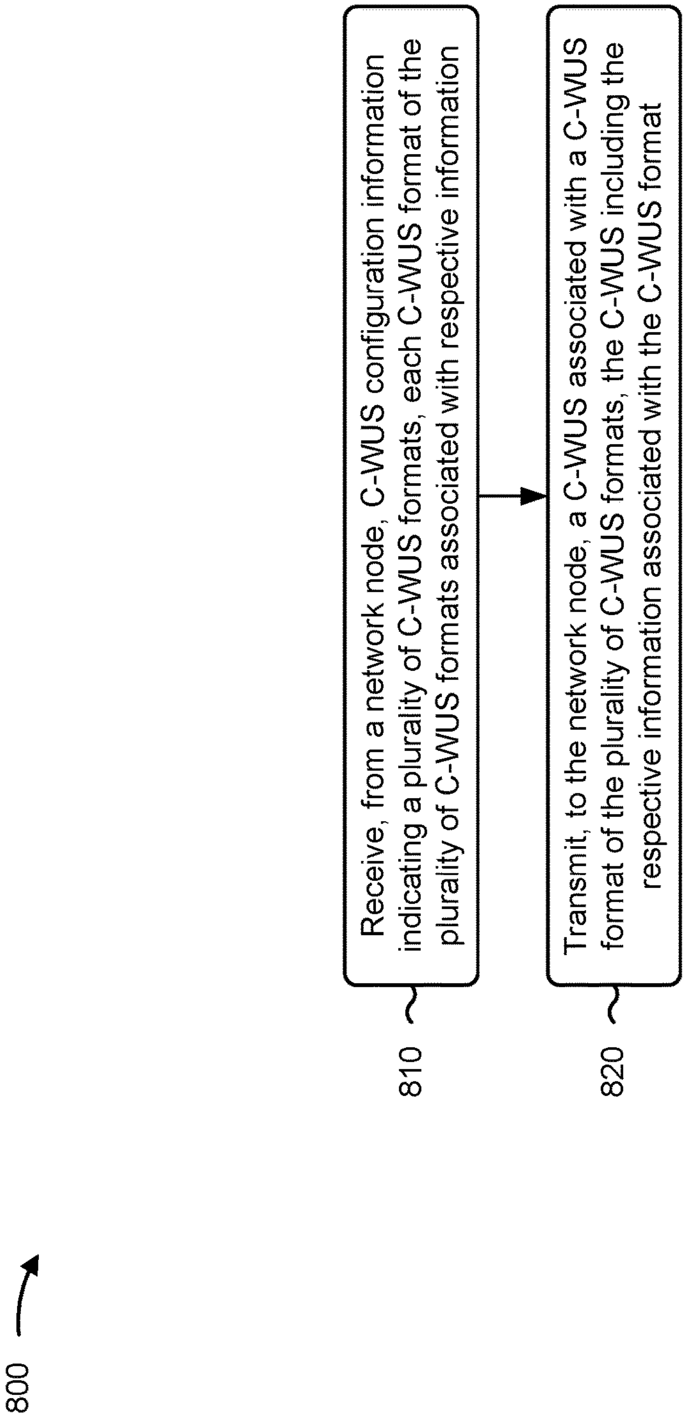
FIG. 8 is a diagram illustrating an example process performed, for example, by a UE, in accordance with the present disclosure.

FIG. 8 is a diagram illustrating an example process 800 performed, for example, by a UE, in accordance with the present disclosure. Example process 800 is an example where the UE (e.g., UE 120) performs operations associated with C-WUS formats and contents for network energy savings.

As shown in FIG. 8, in some aspects, process 800 may include receiving, from a network node, C-WUS configuration information indicating a plurality of C-WUS formats, each C-WUS format of the plurality of C-WUS formats associated with respective information (block 810). For example, the UE (e.g., using reception component 1202 and/or communication manager 1206, depicted in FIG. 12) may receive, from a network node, C-WUS configuration information indicating a plurality of C-WUS formats, each C-WUS format of the plurality of C-WUS formats associated with respective information. In some aspects, the receiving of the C-WUS configuration information may be performed in a similar manner to the reception of the C-WUS configuration information described in connection with reference number 605 of FIG. 6A. The respective information associated with each C-WUS format may include information similar to that described in connection with FIGS. 6A-6C.

As further shown in FIG. 8, in some aspects, process 800 may include transmitting, to the network node, a C-WUS associated with a C-WUS format of the plurality of C-WUS formats, the C-WUS including the respective information associated with the C-WUS format (block 820). For example, the UE (e.g., using transmission component 1204 and/or communication manager 1206, depicted in FIG. 12) may transmit, to the network node, a C-WUS associated with a C-WUS format of the plurality of C-WUS formats, the C-WUS including the respective information associated with the C-WUS format, as described above. In some aspects, the transmitting of the C-WUS may be performed in a similar manner to the transmission of the C-WUS described in connection with reference number 615 of FIG. 6A. The respective information associated with the C-WUS format and included in the C-WUS may include information similar to that described in connection with FIGS. 6A-6C.

Process 800 may include additional aspects, such as any single aspect or any combination of aspects described below and/or in connection with one or more other processes described elsewhere herein.

In a first aspect, process 800 includes communicating with the network node based at least in part on the respective information associated with the C-WUS format and included in the C-WUS (e.g., as described above in connection with FIGS. 6A-6C).

In a second aspect, alone or in combination with the first aspect, the C-WUS configuration information indicates one or more C-WUS monitoring occasions, and transmitting the C-WUS includes transmitting the C-WUS in a C-WUS monitoring occasion of the one or more C-WUS monitoring occasions (e.g., as described above in connection with FIGS. 6A-6C).

In a third aspect, alone or in combination with one or more of the first and second aspects, process 800 includes receiving, from the network node, an indication of the C-WUS format of the plurality of C-WUS formats (e.g., as described above in connection with FIGS. 6A-6C).

In a fourth aspect, alone or in combination with one or more of the first through third aspects, transmitting the C-WUS includes transmitting the C-WUS in multiple stages including a first stage C-WUS indicating first information of the respective information associated with the C-WUS format and a second stage C-WUS indicating second information of the respective information associated with the C-WUS format (e.g., as described above in connection with FIGS. 6A and 6B).

In a fifth aspect, alone or in combination with one or more of the first through fourth aspects, transmitting the C-WUS in multiple stages includes transmitting the first stage C-WUS in a first stage monitoring occasion of a C-WUS monitoring occasion, and transmitting the second stage C-WUS in a second stage monitoring occasion of the C-WUS monitoring occasion (e.g., as described above in connection with FIGS. 6A and 6B).

In a sixth aspect, alone or in combination with one or more of the first through fifth aspects, transmitting the C-WUS includes transmitting, in a first stage, an indication of the C-WUS format associated with the C-WUS, and transmitting, in one or more second stages, the C-WUS including the respective information associated with the C-WUS format (e.g., as described above in connection with FIGS. 6A and 6C).

In a seventh aspect, alone or in combination with one or more of the first through sixth aspects, transmitting, in the first stage, the indication of the C-WUS format includes transmitting the indication of the C-WUS format in a first stage monitoring occasion of a C-WUS monitoring occasion, and transmitting, in the one or more second stages, the C-WUS including the respective information associated with the C-WUS format includes transmitting the C-WUS including the respective information associated with the C-WUS format in one or more second stage monitoring occasions of the C-WUS monitoring occasion (e.g., as described above in connection with FIGS. 6A and 6C).

In an eighth aspect, alone or in combination with one or more of the first through seventh aspects, transmitting, in the first stage, the indication of the C-WUS format includes transmitting, in the first stage, UCI indicating the C-WUS format (e.g., as described above in connection with FIGS. 6A and 6C).

In a ninth aspect, alone or in combination with one or more of the first through eighth aspects, process 800 includes selecting the C-WUS format associated with the C-WUS from the plurality of C-WUS formats (e.g., as described above in connection with FIGS. 6A-6C).

In a tenth aspect, alone or in combination with one or more of the first through ninth aspects, the respective information associated with the C-WUS format includes at least one of an uplink BSR, an uplink DSR, an indication of whether a threshold associated with the uplink BSR is satisfied, or an indication of whether a threshold associated with the uplink DSR is satisfied (e.g., as described above in connection with FIGS. 6A-6C).

In an eleventh aspect, alone or in combination with one or more of the first through tenth aspects, at least one of the threshold associated with the uplink BSR or the threshold associated with the uplink DSR is based on at least one of configuration information received from the network node, an NES of the network node, or an energy state of the UE (e.g., as described above in connection with FIGS. 6A-6C).

In a twelfth aspect, alone or in combination with one or more of the first through eleventh aspects, the respective information associated with the C-WUS format includes a request for a SIB1 and an indication of a minimum time offset between the C-WUS and the SIB1 (e.g., as described above in connection with FIGS. 6A-6C).

In a thirteenth aspect, alone or in combination with one or more of the first through twelfth aspects, the respective information associated with the C-WUS format includes a positioning or sensing request and an indication of a time offset between the C-WUS and a start of a positioning or sensing procedure associated with the positioning or sensing request, e.g., as described above in connection with FIGS. 6A-6C.

In a fourteenth aspect, alone or in combination with one or more of the first through thirteenth aspects, the respective information associated with the C-WUS format includes a positioning or sensing request and an indication of at least one of a priority or latency associated with the positioning or sensing request (e.g., as described above in connection with FIGS. 6A-6C).

In a fifteenth aspect, alone or in combination with one or more of the first through fourteenth aspects, the respective information associated with the C-WUS format includes a CSI report for at least one of a Uu link or a sidelink (e.g., as described above in connection with FIGS. 6A-6C).

In a sixteenth aspect, alone or in combination with one or more of the first through fifteenth aspects, the respective information associated with the C-WUS format includes a PHR (e.g., as described above in connection with FIGS. 6A-6C).

In a seventeenth aspect, alone or in combination with one or more of the first through sixteenth aspects, the respective information associated with the C-WUS format includes at least one of an indication of one or more traffic types associated with uplink or sidelink packets to be transmitted by the UE, an indication of one or more LCG identifiers, an indication of a remaining PDB associated with a highest priority packet of the uplink or sidelink packets to be transmitted by the UE, an indication of a minimum remaining PDB across all of the uplink or sidelink packets to be transmitted by the UE, or an indication of a highest priority associated with the uplink or sidelink packets to be transmitted by the UE (e.g., as described above in connection with FIGS. 6A-6C).

In an eighteenth aspect, alone or in combination with one or more of the first through seventeenth aspects, the respective information associated with the C-WUS format includes a scheduling request for a sidelink communication (e.g., as described above in connection with FIGS. 6A-6C).

In a nineteenth aspect, alone or in combination with one or more of the first through eighteenth aspects, the respective information associated with the C-WUS format includes an energy request associated with energy harvesting by the UE (e.g., as described above in connection with FIGS. 6A-6C).

In a twentieth aspect, alone or in combination with one or more of the first through nineteenth aspects, the respective information associated with the C-WUS format includes at least one of an indication of a configuration of an LP-WUS associated with a WUR of the UE, an activation indication associated with the LP-WUS, a configuration of one or more LP-SSs associated with synchronization of the WUR of the UE, or an indication of whether the LP-WUS supports SSB configuration for the UE (e.g., as described above in connection with FIGS. 6A-6C).

In a twenty-first aspect, alone or in combination with one or more of the first through twentieth aspects, the respective information associated with the C-WUS format includes at least one of an indication of one or more preferred CG configurations, an indication of one or more preferred SPS configurations, an activation indication associated with one or more CG configurations, or an activation indication associated with one or more SPS configurations (e.g., as described above in connection with FIGS. 6A-6C).

In a twenty-second aspect, alone or in combination with one or more of the first through twenty-first aspects, the respective information associated with the C-WUS format includes an indication of at least one of a preferred DRX configuration or a preferred DTX configuration (e.g., as described above in connection with FIGS. 6A-6C).

In a twenty-third aspect, alone or in combination with one or more of the first through twenty-second aspects, the respective information associated with the C-WUS format includes at least one of an indication of a preferred uplink reference signal configuration or an indication of a preferred downlink reference signal configuration (e.g., as described above in connection with FIGS. 6A-6C).

In a twenty-fourth aspect, alone or in combination with one or more of the first through twenty-third aspects, the respective information associated with the C-WUS format includes uplink jitter information (e.g., as described above in connection with FIGS. 6A-6C).

In a twenty-fifth aspect, alone or in combination with one or more of the first through twenty-fourth aspects, the respective information associated with the C-WUS format includes UE energy information including at least one of a current energy state of the UE or a next energy state of the UE (e.g., as described above in connection with FIGS. 6A-6C).

In a twenty-sixth aspect, alone or in combination with one or more of the first through twenty-fifth aspects, the respective information associated with the C-WUS format includes at least one of an indication of a requested uplink TBS or an indication of a requested downlink TBS (e.g., as described above in connection with FIGS. 6A-6C).

In a twenty-seventh aspect, alone or in combination with one or more of the first through twenty-sixth aspects, the respective information associated with the C-WUS format includes at least one of an indication of a requested uplink TBS, an indication of a requested downlink TBS, or an indication of a maximum amount of downlink traffic supported by the UE in a time period (e.g., as described above in connection with FIGS. 6A-6C).

In a twenty-eighth aspect, alone or in combination with one or more of the first through twenty-seventh aspects, the respective information associated with the C-WUS format includes an indication of an SSB index selected by the UE (e.g., as described above in connection with FIGS. 6A-6C).

In a twenty-ninth aspect, alone or in combination with one or more of the first through twenty-eighth aspects, the respective information associated with the C-WUS format includes an indication of a capability of the UE (e.g., as described above in connection with FIGS. 6A-6C).

In a thirtieth aspect, alone or in combination with one or more of the first through twenty-ninth aspects, the respective information associated with the C-WUS format includes one or more emergency bits (e.g., as described above in connection with FIGS. 6A-6C).

Although FIG. 8 shows example blocks of process 800, in some aspects, process 800 may include additional blocks, fewer blocks, different blocks, or differently arranged blocks than those depicted in FIG. 8. Additionally, or alternatively, two or more of the blocks of process 800 may be performed in parallel.

Figure 9:
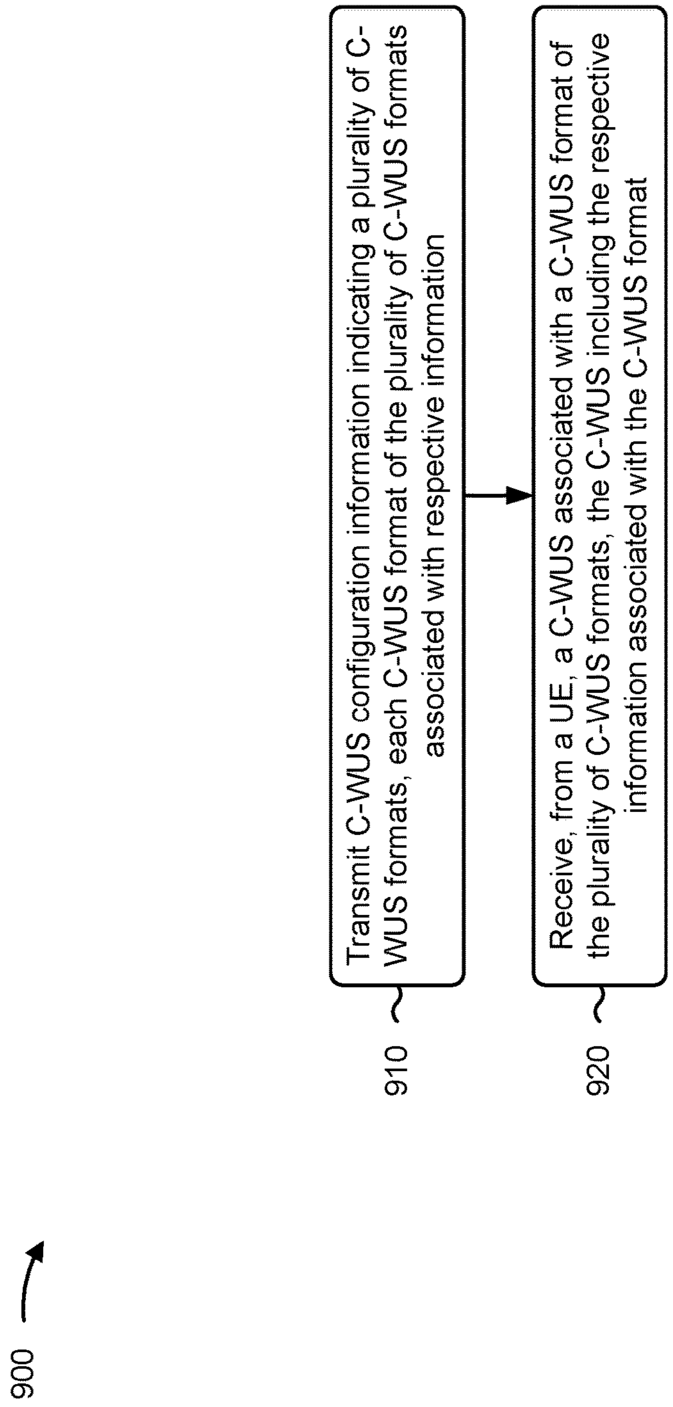
FIG. 9 is a diagram illustrating an example process performed, for example, by a network node, in accordance with the present disclosure.

FIG. 9 is a diagram illustrating an example process 900 performed, for example, by a network node, in accordance with the present disclosure. Example process 900 is an example where the network node (e.g., network node 110) performs operations associated with C-WUS formats and contents for network energy savings.

As shown in FIG. 9, in some aspects, process 900 may include transmitting C-WUS configuration information indicating a plurality of C-WUS formats, each C-WUS format of the plurality of C-WUS formats associated with respective information (block 910). For example, the network node (e.g., using transmission component 1304 and/or communication manager 1306, depicted in FIG. 13) may transmit C-WUS configuration information indicating a plurality of C-WUS formats, each C-WUS format of the plurality of C-WUS formats associated with respective information, as described above. In some aspects, the transmitting of the C-WUS configuration information may be performed in a similar manner to the transmission of the C-WUS configuration information described in connection with reference number 605 of FIG. 6A. The respective information associated with each C-WUS format may include information similar to that described in connection with FIGS. 6A-6C.

As further shown in FIG. 9, in some aspects, process 900 may include receiving, from a UE, a C-WUS associated with a C-WUS format of the plurality of C-WUS formats, the C-WUS including the respective information associated with the C-WUS format (block 920). For example, the network node (e.g., using reception component 1302 and/or communication manager 1306, depicted in FIG. 13) may receive, from a UE, a C-WUS associated with a C-WUS format of the plurality of C-WUS formats, the C-WUS including the respective information associated with the C-WUS format, as described above. In some aspects, the receiving of the C-WUS may be performed in a similar manner to the reception of the C-WUS described in connection with reference number 615 of FIG. 6A. The respective information associated with the C-WUS format and included in the C-WUS may include information similar to that described in connection with FIGS. 6A-6C.

Process 900 may include additional aspects, such as any single aspect or any combination of aspects described below and/or in connection with one or more other processes described elsewhere herein.

In a first aspect, process 900 includes switching from a first network energy state to a second network energy state in connection with receiving the C-WUS (e.g., as described above in connection with FIGS. 6A-6C).

In a second aspect, alone or in combination with the first aspect, process 900 includes communicating with the UE based at least in part on the respective information associated with the C-WUS format and included in the C-WUS (e.g., as described above in connection with FIGS. 6A-6C).

In a third aspect, alone or in combination with one or more of the first and second aspects, the C-WUS configuration information indicates one or more C-WUS monitoring occasions, and receiving the C-WUS includes receiving the C-WUS in a C-WUS monitoring occasion of the one or more C-WUS monitoring occasions (e.g., as described above in connection with FIGS. 6A-6C).

In a fourth aspect, alone or in combination with one or more of the first through third aspects, process 900 includes transmitting an indication of the C-WUS format of the plurality of C-WUS formats (e.g., as described above in connection with FIGS. 6A-6C).

In a fifth aspect, alone or in combination with one or more of the first through fourth aspects, receiving the C-WUS includes receiving the C-WUS in multiple stages including a first stage C-WUS indicating first information of the respective information associated with the C-WUS format and a second stage C-WUS indicating second information of the respective information associated with the C-WUS format (e.g., as described above in connection with FIGS. 6A and 6B).

In a sixth aspect, alone or in combination with one or more of the first through fifth aspects, receiving the C-WUS in multiple stages includes receiving the first stage C-WUS in a first stage monitoring occasion of a C-WUS monitoring occasion, and receiving the second stage C-WUS in a second stage monitoring occasion of the C-WUS monitoring occasion (e.g., as described above in connection with FIGS. 6A and 6B).

In a seventh aspect, alone or in combination with one or more of the first through sixth aspects, receiving the C-WUS includes receiving, in a first stage, an indication of the C-WUS format associated with the C-WUS, and receiving, in one or more second stages, the C-WUS including the respective information associated with the C-WUS format (e.g., as described above in connection with FIGS. 6A and 6C).

In an eighth aspect, alone or in combination with one or more of the first through seventh aspects, receiving, in the first stage, the indication of the C-WUS format includes receiving the indication of the C-WUS format in a first stage monitoring occasion of a C-WUS monitoring occasion, and receiving, in the one or more second stages, the C-WUS including the respective information associated with the C-WUS format includes receiving the C-WUS including the respective information associated with the C-WUS format in one or more second stage monitoring occasions of the C-WUS monitoring occasion (e.g., as described above in connection with FIGS. 6A and 6C).

In a ninth aspect, alone or in combination with one or more of the first through eighth aspects, receiving, in the first stage, the indication of the C-WUS format includes receiving, in the first stage, UCI indicating the C-WUS format (e.g., as described above in connection with FIGS. 6A and 6C).

In a tenth aspect, alone or in combination with one or more of the first through ninth aspects, the respective information associated with the C-WUS format includes at least one of an uplink BSR, an uplink DSR, an indication of whether a threshold associated with the uplink BSR is satisfied, or an indication of whether a threshold associated with the uplink DSR is satisfied (e.g., as described above in connection with FIGS. 6A-6C).

In an eleventh aspect, alone or in combination with one or more of the first through tenth aspects, at least one of the threshold associated with the uplink BSR or the threshold associated with the uplink DSR is based on at least one of configuration information transmitted by the network node, an NES of the network node, or an energy state of the UE (e.g., as described above in connection with FIGS. 6A-6C).

In a twelfth aspect, alone or in combination with one or more of the first through eleventh aspects, the respective information associated with the C-WUS format includes a request for a SIB 1 and an indication of a minimum time offset between the C-WUS and the SIB 1 (e.g., as described above in connection with FIGS. 6A-6C).

In a thirteenth aspect, alone or in combination with one or more of the first through twelfth aspects, the respective information associated with the C-WUS format includes a positioning or sensing request and an indication of a time offset between the C-WUS and a start of a positioning or sensing procedure associated with the positioning or sensing request (e.g., as described above in connection with FIGS. 6A-6C).

In a fourteenth aspect, alone or in combination with one or more of the first through thirteenth aspects, the respective information associated with the C-WUS format includes a positioning or sensing request and an indication of at least one of a priority or latency associated with the positioning or sensing request (e.g., as described above in connection with FIGS. 6A-6C).

In a fifteenth aspect, alone or in combination with one or more of the first through fourteenth aspects, the respective information associated with the C-WUS format includes a CSI report for at least one of a Uu link or a sidelink (e.g., as described above in connection with FIGS. 6A-6C).

In a sixteenth aspect, alone or in combination with one or more of the first through fifteenth aspects, the respective information associated with the C-WUS format includes a PHR (e.g., as described above in connection with FIGS. 6A-6C).

In a seventeenth aspect, alone or in combination with one or more of the first through sixteenth aspects, the respective information associated with the C-WUS format includes at least one of an indication of one or more traffic types associated with uplink or sidelink packets to be transmitted by the UE, an indication of one or more LCG identifiers, an indication of a remaining PDB associated with a highest priority packet of the uplink or sidelink packets to be transmitted by the UE, an indication of a minimum remaining PDB across all of the uplink or sidelink packets to be transmitted by the UE, or an indication of a highest priority associated with the uplink or sidelink packets to be transmitted by the UE (e.g., as described above in connection with FIGS. 6A-6C).

In an eighteenth aspect, alone or in combination with one or more of the first through seventeenth aspects, the respective information associated with the C-WUS format includes a scheduling request for a sidelink communication (e.g., as described above in connection with FIGS. 6A-6C).

In a nineteenth aspect, alone or in combination with one or more of the first through eighteenth aspects, the respective information associated with the C-WUS format includes an energy request associated with energy harvesting by the UE (e.g., as described above in connection with FIGS. 6A-6C).

In a twentieth aspect, alone or in combination with one or more of the first through nineteenth aspects, the respective information associated with the C-WUS format includes at least one of an indication of a configuration of an LP-WUS associated with a WUR of the UE, an activation indication associated with the LP-WUS, a configuration of one or more LP-SSs associated with synchronization of the WUR of the UE, or an indication of whether the LP-WUS supports SSB configuration for the UE (e.g., as described above in connection with FIGS. 6A-6C).

In a twenty-first aspect, alone or in combination with one or more of the first through twentieth aspects, the respective information associated with the C-WUS format includes at least one of an indication of one or more preferred CG configurations, an indication of one or more preferred SPS configurations, an activation indication associated with one or more CG configurations, or an activation indication associated with one or more SPS configurations (e.g., as described above in connection with FIGS. 6A-6C).

In a twenty-second aspect, alone or in combination with one or more of the first through twenty-first aspects, the respective information associated with the C-WUS format includes an indication of at least one of a preferred DRX configuration or a preferred DTX configuration (e.g., as described above in connection with FIGS. 6A-6C).

In a twenty-third aspect, alone or in combination with one or more of the first through twenty-second aspects, the respective information associated with the C-WUS format includes at least one of an indication of a preferred uplink reference signal configuration or an indication of a preferred downlink reference signal configuration (e.g., as described above in connection with FIGS. 6A-6C).

In a twenty-fourth aspect, alone or in combination with one or more of the first through twenty-third aspects, the respective information associated with the C-WUS format includes uplink jitter information (e.g., as described above in connection with FIGS. 6A-6C).

In a twenty-fifth aspect, alone or in combination with one or more of the first through twenty-fourth aspects, the respective information associated with the C-WUS format includes UE energy information including at least one of a current energy state of the UE or a next energy state of the UE (e.g., as described above in connection with FIGS. 6A-6C).

In a twenty-sixth aspect, alone or in combination with one or more of the first through twenty-fifth aspects, the respective information associated with the C-WUS format includes at least one of an indication of a requested uplink TBS or an indication of a requested downlink TBS (e.g., as described above in connection with FIGS. 6A-6C).

In a twenty-seventh aspect, alone or in combination with one or more of the first through twenty-sixth aspects, the respective information associated with the C-WUS format includes at least one of an indication of a requested uplink TBS, an indication of a requested downlink TBS, or an indication of a maximum amount of downlink traffic supported by the UE in a time period (e.g., as described above in connection with FIGS. 6A-6C).

In a twenty-eighth aspect, alone or in combination with one or more of the first through twenty-seventh aspects, the respective information associated with the C-WUS format includes an indication of an SSB index selected by the UE (e.g., as described above in connection with FIGS. 6A-6C).

In a twenty-ninth aspect, alone or in combination with one or more of the first through twenty-eighth aspects, the respective information associated with the C-WUS format includes an indication of a capability of the UE (e.g., as described above in connection with FIGS. 6A-6C).

In a thirtieth aspect, alone or in combination with one or more of the first through twenty-ninth aspects, the respective information associated with the C-WUS format includes one or more emergency bits (e.g., as described above in connection with FIGS. 6A-6C).

Although FIG. 9 shows example blocks of process 900, in some aspects, process 900 may include additional blocks, fewer blocks, different blocks, or differently arranged blocks than those depicted in FIG. 9. Additionally, or alternatively, two or more of the blocks of process 900 may be performed in parallel.

Figure 10:
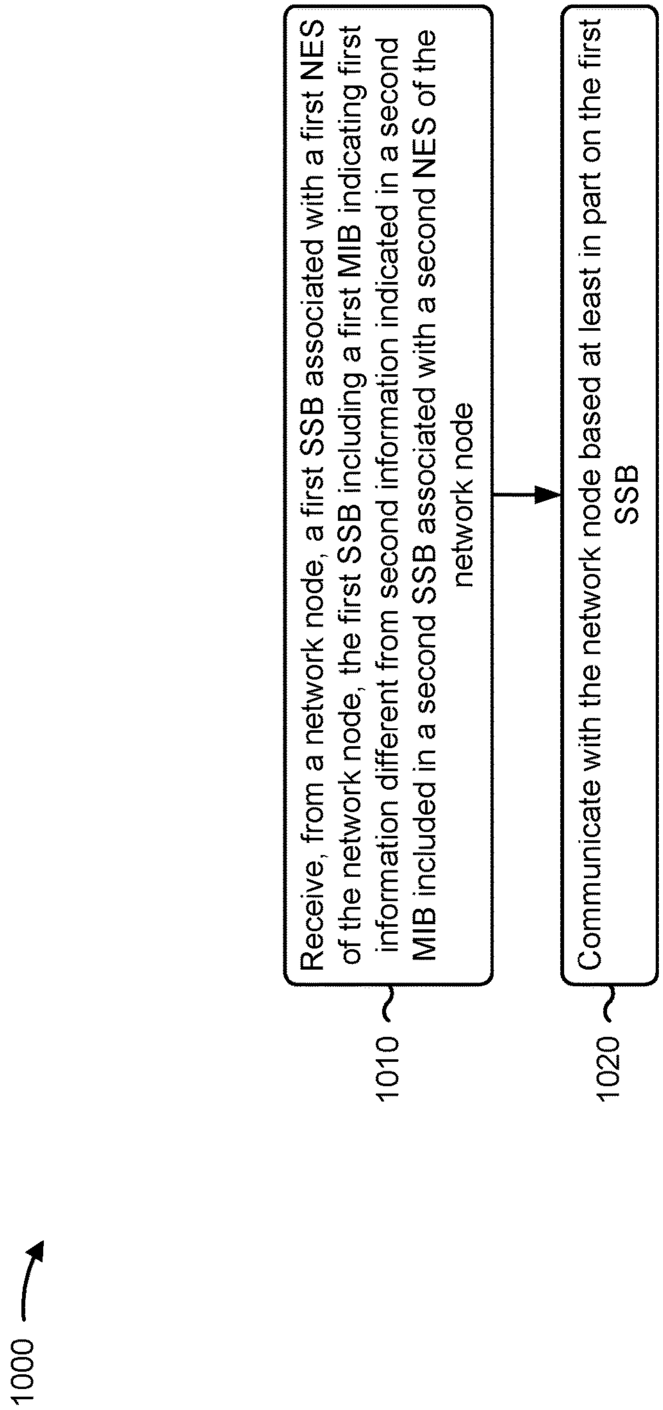
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with a simplified version of an SSB for network energy savings.

As shown in FIG. 10, in some aspects, process 1000 may include receiving, from a network node, a first SSB associated with a first NES of the network node, the first SSB including a first MIB indicating first information different from second information indicated in a second MIB included in a second SSB associated with a second NES of the network node (block 1010). For example, the UE (e.g., using reception component 1202 and/or communication manager 1206, depicted in FIG. 12) may receive, from a network node, a first SSB associated with a first NES of the network node, the first SSB including a first MIB indicating first information different from second information indicated in a second MIB included in a second SSB associated with a second NES of the network node, as described above. In some aspects, the receiving of the first SSB may be performed in a similar manner to the reception of the first SSB described in connection with reference number 705 of FIG. 7. The first information indicated in the first MIB included in the first SSB may include information similar to that described in connection with FIG. 7.

As further shown in FIG. 10, in some aspects, process 1000 may include communicating with the network node based at least in part on the first SSB (block 1020). For example, the UE (e.g., using reception component 1202, transmission component 1204, and/or communication manager 1206, depicted in FIG. 12) may communicate with the network node based at least in part on the first SSB, as described above. In some aspects, the UE may communicate with the network node based at least in part on the first SSB in a similar manner to the communication described in connection with reference number 710 of FIG. 7.

Process 1000 may include additional aspects, such as any single aspect or any combination of aspects described below and/or in connection with one or more other processes described elsewhere herein.

In a first aspect, the first information includes an indication of whether a cell is barred (e.g., as described above in connection with FIG. 7).

In a second aspect, alone or in combination with the first aspect, the first information includes an indication of one or more C-WUS triggering conditions, the indication of the one or more C-WUS triggering conditions including at least one of an uplink BSR threshold, an uplink DSR threshold, an energy level threshold, a charging rate threshold, or a discharging rate threshold (e.g., as described above in connection with FIG. 7).

In a third aspect, alone or in combination with one or more of the first and second aspects, the first information includes one or more emergency bits (e.g., as described above in connection with FIG. 7).

In a fourth aspect, alone or in combination with one or more of the first through third aspects, the first information includes at least one of an indication of a current NES of the network node, an indication of a remaining time in the current NES, an indication of a next NES of the network node, or an indication of a pattern of NESs for the network node (e.g., as described above in connection with FIG. 7).

In a fifth aspect, alone or in combination with one or more of the first through fourth aspects, the first information includes an indication of a SIB1 format of a plurality of SIB 1 formats associated with the first NES (e.g., as described above in connection with FIG. 7).

In a sixth aspect, alone or in combination with one or more of the first through fifth aspects, the first information includes an indication of a system information change (e.g., as described above in connection with FIG. 7).

In a seventh aspect, alone or in combination with one or more of the first through sixth aspects, the first information includes at least one of an indication of whether the network node supports LP-WUS transmission, an indication of one or more classes of WUR for which the network node supports LP-WUS transmission, or an indication of whether the network node supports transmission of at least one of a supported LP-SS, a supported LP-RS, or a supported preamble signal for each of the one or more classes of WUR for which the network node supports LP-WUS transmission (e.g., as described above in connection with FIG. 7).

In an eighth aspect, alone or in combination with one or more of the first through seventh aspects, the first information includes an indication of whether the network node supports WUR-based UEs in the first NES of the network node (e.g., as described above in connection with FIG. 7).

In a ninth aspect, alone or in combination with one or more of the first through eighth aspects, the first information includes an indication of whether WUR-based UEs are barred (e.g., as described above in connection with FIG. 7).

In a tenth aspect, alone or in combination with one or more of the first through ninth aspects, the first information includes at least one of an indication of whether the network node supports one or more energy services, or an indication of whether the network node supports communication with at least one of passive devices, semi-passive devices, active tags, or energy harvesting devices (e.g., as described above in connection with FIG. 7).

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
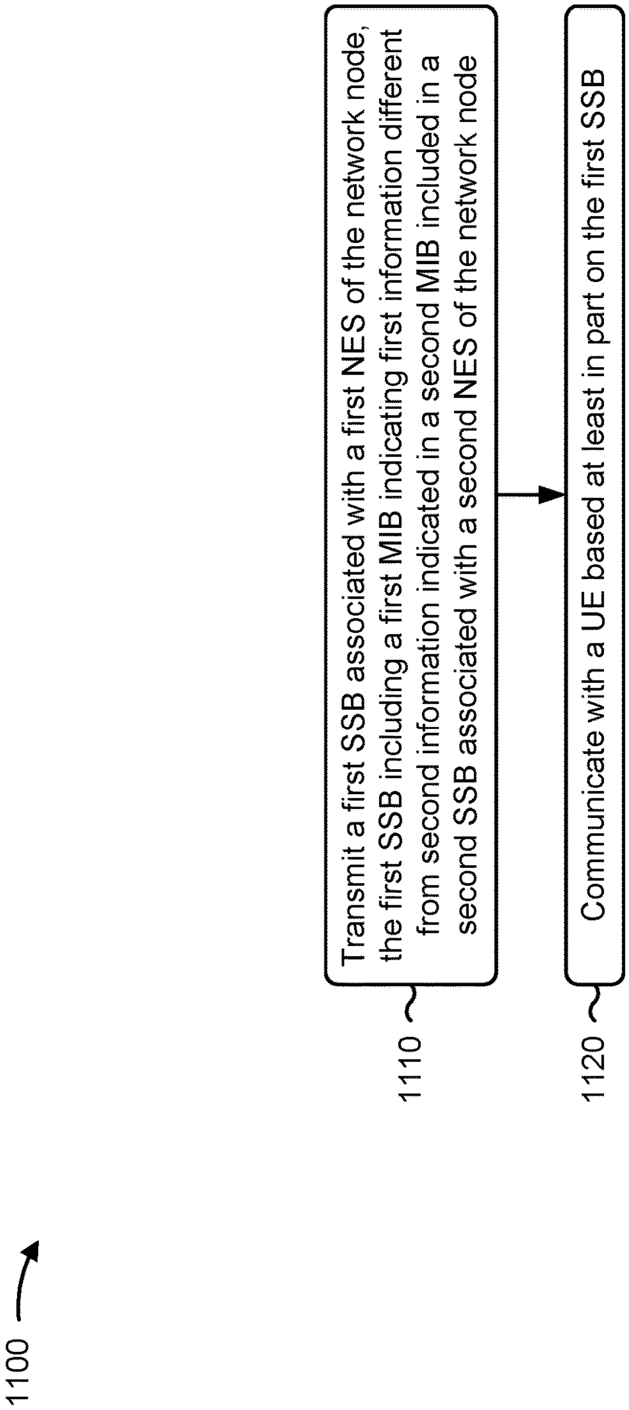
FIG. 11 is a diagram illustrating an example process performed, for example, by a network node, in accordance with the present disclosure.

FIG. 11 is a diagram illustrating an example process 1100 performed, for example, by a network node, in accordance with the present disclosure. Example process 1100 is an example where the network node (e.g., network node 110) performs operations associated with a simplified version of an SSB for network energy savings.

As shown in FIG. 11, in some aspects, process 1100 may include transmitting a first SSB associated with a first NES of the network node, the first SSB including a first MIB indicating first information different from second information indicated in a second MIB included in a second SSB associated with a second NES of the network node (block 1110). For example, the network node (e.g., using transmission component 1304 and/or communication manager 1306, depicted in FIG. 13) may transmit a first SSB associated with a first NES of the network node, the first SSB including a first MIB indicating first information different from second information indicated in a second MIB included in a second SSB associated with a second NES of the network node, as described above. In some aspects, the transmitting of the first SSB may be performed in a similar manner to the transmission of the first SSB described in connection with reference number 705 of FIG. 7. The first information indicated in the first MIB included in the first SSB may include information similar to that described in connection with FIG. 7.

As further shown in FIG. 11, in some aspects, process 1100 may include communicating with a UE based at least in part on the first SSB (block 1120). For example, the network node (e.g., using reception component 1302, transmission component 1304, and/or communication manager 1306, depicted in FIG. 13) may communicate with a UE based at least in part on the first SSB, as described above. In some aspects, the network node may communicate with the UE based at least in part on the first SSB in a similar manner to the communication described in connection with reference number 710 of FIG. 7.

Process 1100 may include additional aspects, such as any single aspect or any combination of aspects described below and/or in connection with one or more other processes described elsewhere herein.

In a first aspect, the first information includes an indication of whether a cell is barred (e.g., as described above in connection with FIG. 7).

In a second aspect, alone or in combination with the first aspect, the first information includes an indication of one or more C-WUS triggering conditions, the indication of the one or more C-WUS triggering conditions including at least one of an uplink BSR threshold, an uplink DSR threshold, an energy level threshold, a charging rate threshold, or a discharging rate threshold (e.g., as described above in connection with FIG. 7).

In a third aspect, alone or in combination with one or more of the first and second aspects, the first information includes one or more emergency bits (e.g., as described above in connection with FIG. 7).

In a fourth aspect, alone or in combination with one or more of the first through third aspects, the first information includes at least one of an indication of a current NES of the network node, an indication of a remaining time in the current NES, an indication of a next NES of the network node, or an indication of a pattern of NESs for the network node (e.g., as described above in connection with FIG. 7).

In a fifth aspect, alone or in combination with one or more of the first through fourth aspects, the first information includes an indication of a SIB1 format of a plurality of SIB1 formats associated with the first NES (e.g., as described above in connection with FIG. 7).

In a sixth aspect, alone or in combination with one or more of the first through fifth aspects, the first information includes an indication of a system information change (e.g., as described above in connection with FIG. 7).

In a seventh aspect, alone or in combination with one or more of the first through sixth aspects, the first information includes at least one of an indication of whether the network node supports LP-WUS transmission, an indication of one or more classes of WUR for which the network node supports LP-WUS transmission, or an indication of whether the network node supports transmission of at least one of a supported LP-SS, a supported LP-RS, or a supported preamble signal for each of the one or more classes of WUR for which the network node supports LP-WUS transmission (e.g., as described above in connection with FIG. 7).

In an eighth aspect, alone or in combination with one or more of the first through seventh aspects, the first information includes an indication of whether the network node supports WUR-based UEs in the first NES of the network node (e.g., as described above in connection with FIG. 7).

In a ninth aspect, alone or in combination with one or more of the first through eighth aspects, the first information includes an indication of whether WUR-based UEs are barred (e.g., as described above in connection with FIG. 7).

In a tenth aspect, alone or in combination with one or more of the first through ninth aspects, the first information includes at least one of an indication of whether the network node supports one or more energy services, or an indication of whether the network node supports communication with at least one of passive devices, semi-passive devices, active tags, or energy harvesting devices (e.g., as described above in connection with FIG. 7).

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
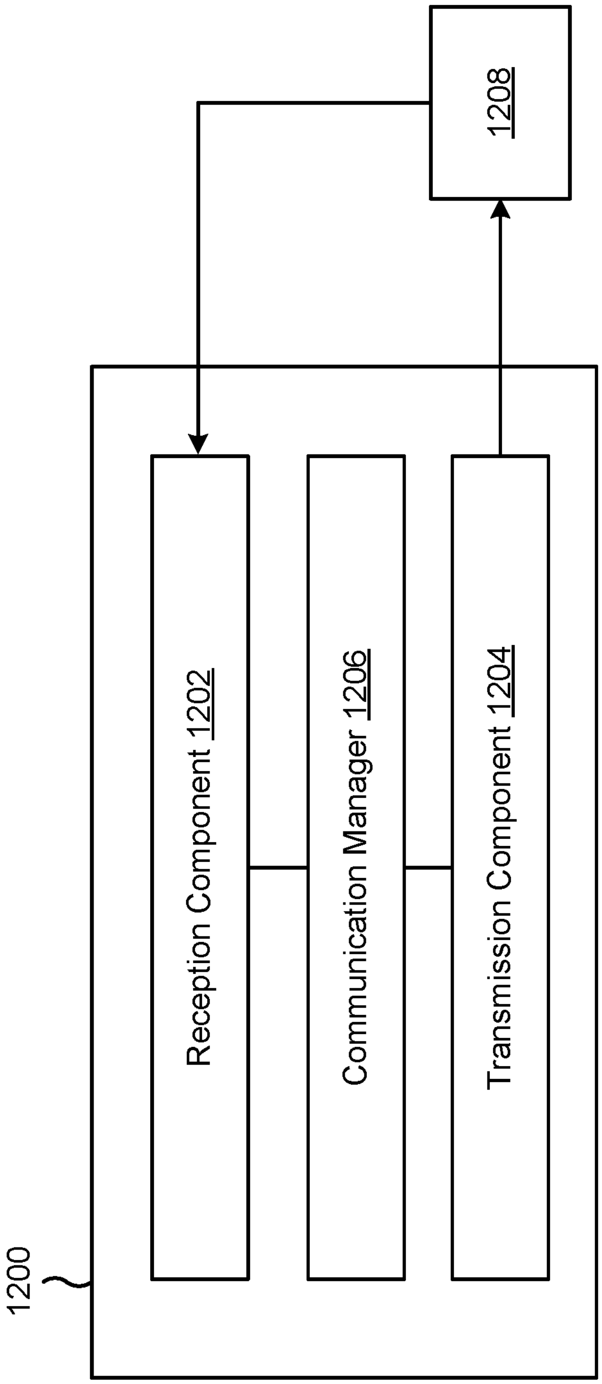
FIGS. 12-13 are diagrams of example apparatuses for wireless communication, in accordance with the present disclosure.

FIG. 12 is a diagram of an example apparatus 1200 for wireless communication, in accordance with the present disclosure. The apparatus 1200 may be a UE, or a UE may include the apparatus 1200. In some aspects, the apparatus 1200 includes a reception component 1202, a transmission component 1204, and/or a communication manager 1206, which may be in communication with one another (for example, via one or more buses and/or one or more other components). In some aspects, the communication manager 1206 is the communication manager 140 described in connection with FIG. 1. As shown, the apparatus 1200 may communicate with another apparatus 1208, such as a UE or a network node (such as a CU, a DU, an RU, or a base station), using the reception component 1202 and the transmission component 1204.

In some aspects, the apparatus 1200 may be configured to perform one or more operations described herein in connection with FIGS. 6A-6C and 7. Additionally, or alternatively, the apparatus 1200 may be configured to perform one or more processes described herein, such as process 800 of FIG. 8, process 1000 of FIG. 10, or a combination thereof. In some aspects, the apparatus 1200 and/or one or more components shown in FIG. 12 may include one or more components of the UE described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1208. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE described in connection with FIG. 2.

The transmission component 1204 may transmit communications, such as reference signals, control information, data communications, or a combination thereof, to the apparatus 1208. In some aspects, one or more other components of the apparatus 1200 may generate communications and may provide the generated communications to the transmission component 1204 for transmission to the apparatus 1208. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1208. In some aspects, the transmission component 1204 may include one or more antennas, a modem, a modulator, a transmit MIMO processor, a transmit processor, a controller/processor, a memory, or a combination thereof, of the UE described in connection with FIG. 2. In some aspects, the transmission component 1204 may be co-located with the reception component 1202 in a transceiver.

The communication manager 1206 may support operations of the reception component 1202 and/or the transmission component 1204. For example, the communication manager 1206 may receive information associated with configuring reception of communications by the reception component 1202 and/or transmission of communications by the transmission component 1204. Additionally, or alternatively, the communication manager 1206 may generate and/or provide control information to the reception component 1202 and/or the transmission component 1204 to control reception and/or transmission of communications.

The reception component 1202 may receive, from a network node, C-WUS configuration information indicating a plurality of C-WUS formats, each C-WUS format of the plurality of C-WUS formats associated with respective information. The transmission component 1204 may transmit, to the network node, a C-WUS associated with a C-WUS format of the plurality of C-WUS formats, the C-WUS including the respective information associated with the C-WUS format.

The reception component 1202, the transmission component 1204, and/or the communications manager 1206 may communicate with the network node based at least in part on the respective information associated with the C-WUS format and included in the C-WUS.

The reception component 1202 may receive, from the network node, an indication of the C-WUS format of the plurality of C-WUS formats.

The communication manager 1206 may select the C-WUS format associated with the C-WUS from the plurality of C-WUS formats.

The reception component 1202 may receive, from a network node, a first SSB associated with a first NES of the network node, the first SSB including a first MIB indicating first information different from second information indicated in a second MIB included in a second SSB associated with a second NES of the network node. The reception component 1202 and/or the transmission component 1204 may communicate with the network node based at least in part on the first SSB.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

Figure 13:
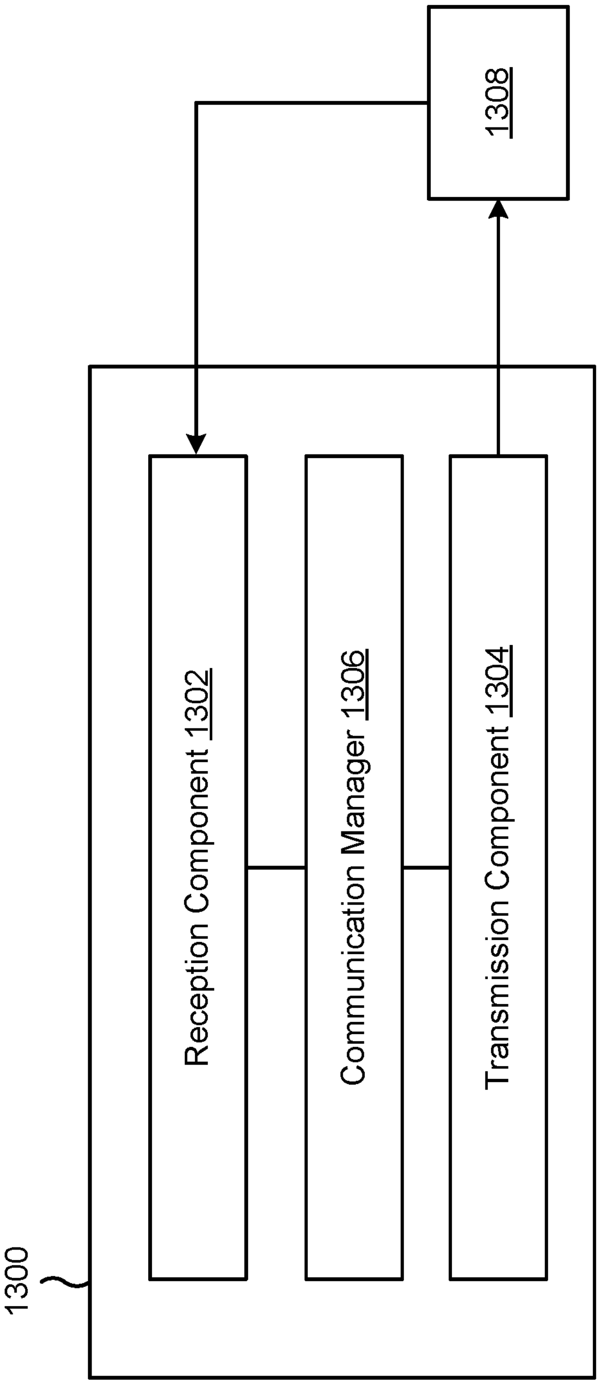

FIG. 13 is a diagram of an example apparatus 1300 for wireless communication, in accordance with the present disclosure. The apparatus 1300 may be a network node, or a network node may include the apparatus 1300. In some aspects, the apparatus 1300 includes a reception component 1302, a transmission component 1304, and/or a communication manager 1306, which may be in communication with one another (for example, via one or more buses and/or one or more other components). In some aspects, the communication manager 1306 is the communication manager 150 described in connection with FIG. 1. As shown, the apparatus 1300 may communicate with another apparatus 1308, such as a UE or a network node (such as a CU, a DU, an RU, or a base station), using the reception component 1302 and the transmission component 1304.

In some aspects, the apparatus 1300 may be configured to perform one or more operations described herein in connection with FIGS. 6A-6C and 7. Additionally, or alternatively, the apparatus 1300 may be configured to perform one or more processes described herein, such as process 900 of FIG. 9, process 1100 of FIG. 11, or a combination thereof. In some aspects, the apparatus 1300 and/or one or more components shown in FIG. 13 may include one or more components of the network node described in connection with FIG. 2. Additionally, or alternatively, one or more components shown in FIG. 13 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1302 may receive communications, such as reference signals, control information, data communications, or a combination thereof, from the apparatus 1308. The reception component 1302 may provide received communications to one or more other components of the apparatus 1300. In some aspects, the reception component 1302 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1300. In some aspects, the reception component 1302 may include one or more antennas, a modem, a demodulator, a MIMO detector, a receive processor, a controller/processor, a memory, or a combination thereof, of the network node described in connection with FIG. 2. In some aspects, the reception component 1302 and/or the transmission component 1304 may include or may be included in a network interface. The network interface may be configured to obtain and/or output signals for the apparatus 1300 via one or more communications links, such as a backhaul link, a midhaul link, and/or a fronthaul link.

The transmission component 1304 may transmit communications, such as reference signals, control information, data communications, or a combination thereof, to the apparatus 1308. In some aspects, one or more other components of the apparatus 1300 may generate communications and may provide the generated communications to the transmission component 1304 for transmission to the apparatus 1308. In some aspects, the transmission component 1304 may perform signal processing on the generated communications (such as filtering, amplification, modulation, digital-to-analog conversion, multiplexing, interleaving, mapping, or encoding, among other examples), and may transmit the processed signals to the apparatus 1308. In some aspects, the transmission component 1304 may include one or more antennas, a modem, a modulator, a transmit MIMO processor, a transmit processor, a controller/processor, a memory, or a combination thereof, of the network node described in connection with FIG. 2. In some aspects, the transmission component 1304 may be co-located with the reception component 1302 in a transceiver.

The communication manager 1306 may support operations of the reception component 1302 and/or the transmission component 1304. For example, the communication manager 1306 may receive information associated with configuring reception of communications by the reception component 1302 and/or transmission of communications by the transmission component 1304. Additionally, or alternatively, the communication manager 1306 may generate and/or provide control information to the reception component 1302 and/or the transmission component 1304 to control reception and/or transmission of communications.

The transmission component 1304 may transmit C-WUS configuration information indicating a plurality of C-WUS formats, each C-WUS format of the plurality of C-WUS formats associated with respective information. The reception component 1302 may receive, from a UE, a C-WUS associated with a C-WUS format of the plurality of C-WUS formats, the C-WUS including the respective information associated with the C-WUS format.

The communication manager 1306 may switch from a first network energy state to a second network energy state in connection with receiving the C-WUS.

The reception component 1302, the transmission component 1304, and/or the communication manager 1306 may communicate with the UE based at least in part on the respective information associated with the C-WUS format and included in the C-WUS.

The transmission component 1304 may transmit an indication of the C-WUS format of the plurality of C-WUS formats.

The transmission component 1304 may transmit a first SSB associated with a first NES of the network node, the first SSB including a first MIB indicating first information different from second information indicated in a second MIB included in a second SSB associated with a second NES of the network node. The reception component 1302 and/or the transmission component 1304 may communicate with a UE based at least in part on the first SSB.

The number and arrangement of components shown in FIG. 13 are provided as an example. In practice, there may be additional components, fewer components, different components, or differently arranged components than those shown in FIG. 13. Furthermore, two or more components shown in FIG. 13 may be implemented within a single component, or a single component shown in FIG. 13 may be implemented as multiple, distributed components. Additionally, or alternatively, a set of (one or more) components shown in FIG. 13 may perform one or more functions described as being performed by another set of components shown in FIG. 13.

The following provides an overview of some Aspects of the present disclosure:

Aspect 1: A method of wireless communication performed by a user equipment (UE), comprising: receiving, from a network node, cell wake-up signal (C-WUS) configuration information indicating a plurality of C-WUS formats, each C-WUS format of the plurality of C-WUS formats associated with respective information; and transmitting, to the network node, a C-WUS associated with a C-WUS format of the plurality of C-WUS formats, the C-WUS including the respective information associated with the C-WUS format.

Aspect 2: The method of Aspect 1, further comprising: communicating with the network node based at least in part on the respective information associated with the C-WUS format and included in the C-WUS.

Aspect 3: The method of any of Aspects 1-2, wherein the C-WUS configuration information indicates one or more C-WUS monitoring occasions, and wherein transmitting the C-WUS comprises: transmitting the C-WUS in a C-WUS monitoring occasion of the one or more C-WUS monitoring occasions.

Aspect 4: The method of any of Aspects 1-3, further comprising: receiving, from the network node, an indication of the C-WUS format of the plurality of C-WUS formats.

Aspect 5: The method of any of Aspects 1-4, wherein transmitting the C-WUS comprises: transmitting the C-WUS in multiple stages including a first stage C-WUS indicating first information of the respective information associated with the C-WUS format and a second stage C-WUS indicating second information of the respective information associated with the C-WUS format.

Aspect 6: The method of Aspect 5, wherein transmitting the C-WUS in multiple stages comprises: transmitting the first stage C-WUS in a first stage monitoring occasion of a C-WUS monitoring occasion; and transmitting the second stage C-WUS in a second stage monitoring occasion of the C-WUS monitoring occasion.

Aspect 7: The method of any of Aspects 1-4, wherein transmitting the C-WUS comprises: transmitting, in a first stage, an indication of the C-WUS format associated with the C-WUS; and transmitting, in one or more second stages, the C-WUS including the respective information associated with the C-WUS format.

Aspect 8: The method of Aspect 7, wherein transmitting, in the first stage, the indication of the C-WUS format comprises transmitting the indication of the C-WUS format in a first stage monitoring occasion of a C-WUS monitoring occasion, and wherein transmitting, in the one or more second stages, the C-WUS including the respective information associated with the C-WUS format comprises transmitting the C-WUS including the respective information associated with the C-WUS format in one or more second stage monitoring occasions of the C-WUS monitoring occasion.

Aspect 9: The method of any of Aspects 7-8, wherein transmitting, in the first stage, the indication of the C-WUS format comprises: transmitting, in the first stage, uplink control information (UCI) indicating the C-WUS format.

Aspect 10: The method of any of Aspects 7-9, further comprising: selecting the C-WUS format associated with the C-WUS from the plurality of C-WUS formats.

Aspect 11: The method of any of Aspects 1-10, wherein the respective information associated with the C-WUS format includes at least one of: an uplink buffer status report (BSR), an uplink delay status report (DSR), an indication of whether a threshold associated with the uplink BSR is satisfied, or an indication of whether a threshold associated with the uplink DSR is satisfied.

Aspect 12: The method of Aspect 11, wherein at least one of the threshold associated with the uplink BSR or the threshold associated with the uplink DSR is based on at least one of configuration information received from the network node, a network energy state (NES) of the network node, or an energy state of the UE.

Aspect 13: The method of any of Aspects 1-12, wherein the respective information associated with the C-WUS format includes a request for a system information block type 1 (SIB1) and an indication of a minimum time offset between the C-WUS and the SIB1.

Aspect 14: The method of any of Aspects 1-13, wherein the respective information associated with the C-WUS format includes a positioning or sensing request and an indication of a time offset between the C-WUS and a start of a positioning or sensing procedure associated with the positioning or sensing request.

Aspect 15: The method of any of Aspects 1-14, wherein the respective information associated with the C-WUS format includes a positioning or sensing request and an indication of at least one of a priority or latency associated with the positioning or sensing request.

Aspect 16: The method of any of Aspects 1-15, wherein the respective information associated with the C-WUS format includes a channel state information (CSI) report for at least one of a Uu link or a sidelink.

Aspect 17: The method of any of Aspects 1-16, wherein the respective information associated with the C-WUS format includes a power headroom report (PHR).

Aspect 18: The method of any of Aspects 1-17, wherein the respective information associated with the C-WUS format includes at least one of: an indication of one or more traffic types associated with uplink or sidelink packets to be transmitted by the UE, an indication of one or more logical channel group (LCG) identifiers, an indication of a remaining packet delay budget (PDB) associated with a highest priority packet of the uplink or sidelink packets to be transmitted by the UE, an indication of a minimum remaining PDB across all of the uplink or sidelink packets to be transmitted by the UE, or an indication of a highest priority associated with the uplink or sidelink packets to be transmitted by the UE.

Aspect 19: The method of any of Aspects 1-18, wherein the respective information associated with the C-WUS format includes a scheduling request for a sidelink communication.

Aspect 20: The method of any of Aspects 1-19, wherein the respective information associated with the C-WUS format includes an energy request associated with energy harvesting by the UE.

Aspect 21: The method of any of Aspects 1-20, wherein the respective information associated with the C-WUS format includes at least one of: an indication of a configuration of a low power wake-up signal (LP-WUS) associated with a wake-up radio (WUR) of the UE, an activation indication associated with the LP-WUS, a configuration of one or more low power synchronization signals (LP-SSs) associated with synchronization of the WUR of the UE, or an indication of whether the LP-WUS supports synchronization signal block (SSB) configuration for the UE.

Aspect 22: The method of any of Aspects 1-21, wherein the respective information associated with the C-WUS format includes at least one of: an indication of one or more preferred configured grant (CG) configurations, an indication of one or more preferred semi-persistent scheduling (SPS) configurations, an activation indication associated with one or more CG configurations, or an activation indication associated with one or more SPS configurations.

Aspect 23: The method of any of Aspects 1-22, wherein the respective information associated with the C-WUS format includes an indication of at least one of a preferred discontinuous reception (DRX) configuration or a preferred discontinuous transmission (DTX) configuration.

Aspect 24: The method of any of Aspects 1-23, wherein the respective information associated with the C-WUS format includes at least one of an indication of a preferred uplink reference signal configuration or an indication of a preferred downlink reference signal configuration.

Aspect 25: The method of any of Aspects 1-24, wherein the respective information associated with the C-WUS format includes uplink jitter information.

Aspect 26: The method of any of Aspects 1-25, wherein the respective information associated with the C-WUS format includes UE energy information including at least one of a current energy state of the UE or a next energy state of the UE.

Aspect 27: The method of any of Aspects 1-26, wherein the respective information associated with the C-WUS format includes at least one of an indication of a requested uplink transport block size (TBS) or an indication of a requested downlink TBS.

Aspect 28: The method of any of Aspects 1-27, wherein the respective information associated with the C-WUS format includes at least one of: an indication of a requested uplink transport block size (TBS), an indication of a requested downlink TBS, or an indication of a maximum amount of downlink traffic supported by the UE in a time period.

Aspect 29: The method of any of Aspects 1-28, wherein the respective information associated with the C-WUS format includes an indication of a synchronization signal block (SSB) index selected by the UE.

Aspect 30: The method of any of Aspects 1-29, wherein the respective information associated with the C-WUS format includes an indication of a capability of the UE.

Aspect 31: The method of any of Aspects 1-30, wherein the respective information associated with the C-WUS format includes one or more emergency bits.

Aspect 32: A method of wireless communication performed by a network node, comprising: transmitting cell wake-up signal (C-WUS) configuration information indicating a plurality of C-WUS formats, each C-WUS format of the plurality of C-WUS formats associated with respective information; and receiving, from a user equipment (UE), a C-WUS associated with a C-WUS format of the plurality of C-WUS formats, the C-WUS including the respective information associated with the C-WUS format.

Aspect 33: The method of Aspect 32, further comprising: switching from a first network energy state to a second network energy state in connection with receiving the C-WUS.

Aspect 34: The method of any of Aspects 32-33, further comprising: communicating with the UE based at least in part on the respective information associated with the C-WUS format and included in the C-WUS.

Aspect 35: The method of any of Aspects 32-34, wherein the C-WUS configuration information indicates one or more C-WUS monitoring occasions, and wherein receiving the C-WUS comprises: receiving the C-WUS in a C-WUS monitoring occasion of the one or more C-WUS monitoring occasions.

Aspect 36: The method of any of Aspects 32-35, further comprising: transmitting an indication of the C-WUS format of the plurality of C-WUS formats.

Aspect 37: The method of any of Aspects 32-36, wherein receiving the C-WUS comprises: receiving the C-WUS in multiple stages including a first stage C-WUS indicating first information of the respective information associated with the C-WUS format and a second stage C-WUS indicating second information of the respective information associated with the C-WUS format.

Aspect 38: The method of Aspect 37, wherein receiving the C-WUS in multiple stages comprises: receiving the first stage C-WUS in a first stage monitoring occasion of a C-WUS monitoring occasion; and receiving the second stage C-WUS in a second stage monitoring occasion of the C-WUS monitoring occasion.

Aspect 39: The method of any of Aspects 32-36, wherein receiving the C-WUS comprises: receiving, in a first stage, an indication of the C-WUS format associated with the C-WUS; and receiving, in one or more second stages, the C-WUS including the respective information associated with the C-WUS format.

Aspect 40: The method of Aspect 39, wherein receiving, in the first stage, the indication of the C-WUS format comprises receiving the indication of the C-WUS format in a first stage monitoring occasion of a C-WUS monitoring occasion, and wherein receiving, in the one or more second stages, the C-WUS including the respective information associated with the C-WUS format comprises receiving the C-WUS including the respective information associated with the C-WUS format in one or more second stage monitoring occasions of the C-WUS monitoring occasion.

Aspect 41: The method of any of Aspects 39-40, wherein receiving, in the first stage, the indication of the C-WUS format comprises: receiving, in the first stage, uplink control information (UCI) indicating the C-WUS format.

Aspect 42: The method of any of Aspects 32-41, wherein the respective information associated with the C-WUS format includes at least one of: an uplink buffer status report (BSR), an uplink delay status report (DSR), an indication of whether a threshold associated with the uplink BSR is satisfied, or an indication of whether a threshold associated with the uplink DSR is satisfied.

Aspect 43: The method of Aspect 42, wherein at least one of the threshold associated with the uplink BSR or the threshold associated with the uplink DSR is based on at least one of configuration information transmitted by the network node, a network energy state (NES) of the network node, or an energy state of the UE.

Aspect 44: The method of any of Aspects 32-43, wherein the respective information associated with the C-WUS format includes a request for a system information block type 1 (SIB1) and an indication of a minimum time offset between the C-WUS and the SIB1.

Aspect 45: The method of any of Aspects 32-44, wherein the respective information associated with the C-WUS format includes a positioning or sensing request and an indication of a time offset between the C-WUS and a start of a positioning or sensing procedure associated with the positioning or sensing request.

Aspect 46: The method of any of Aspects 32-45, wherein the respective information associated with the C-WUS format includes a positioning or sensing request and an indication of at least one of a priority or latency associated with the positioning or sensing request.

Aspect 47: The method of any of Aspects 32-46, wherein the respective information associated with the C-WUS format includes a channel state information (CSI) report for at least one of a Uu link or a sidelink.

Aspect 48: The method of any of Aspects 32-47, wherein the respective information associated with the C-WUS format includes a power headroom report (PHR).

Aspect 49: The method of any of Aspects 32-48, wherein the respective information associated with the C-WUS format includes at least one of: an indication of one or more traffic types associated with uplink or sidelink packets to be transmitted by the UE, an indication of one or more logical channel group (LCG) identifiers, an indication of a remaining packet delay budget (PDB) associated with a highest priority packet of the uplink or sidelink packets to be transmitted by the UE, an indication of a minimum remaining PDB across all of the uplink or sidelink packets to be transmitted by the UE, or an indication of a highest priority associated with the uplink or sidelink packets to be transmitted by the UE.

Aspect 50: The method of any of Aspects 32-49, wherein the respective information associated with the C-WUS format includes a scheduling request for a sidelink communication.

Aspect 51: The method of any of Aspects 32-50, wherein the respective information associated with the C-WUS format includes an energy request associated with energy harvesting by the UE.

Aspect 52: The method of any of Aspects 32-51, wherein the respective information associated with the C-WUS format includes at least one of: an indication of a configuration of a low power wake-up signal (LP-WUS) associated with a wake-up radio (WUR) of the UE, an activation indication associated with the LP-WUS, a configuration of one or more low power synchronization signals (LP-SSs) associated with synchronization of the WUR of the UE, or an indication of whether the LP-WUS supports synchronization signal block (SSB) configuration for the UE.

Aspect 53: The method of any of Aspects 32-52, wherein the respective information associated with the C-WUS format includes at least one of: an indication of one or more preferred configured grant (CG) configurations, an indication of one or more preferred semi-persistent scheduling (SPS) configurations, an activation indication associated with one or more CG configurations, or an activation indication associated with one or more SPS configurations.

Aspect 54: The method of any of Aspects 32-53, wherein the respective information associated with the C-WUS format includes an indication of at least one of a preferred discontinuous reception (DRX) configuration or a preferred discontinuous transmission (DTX) configuration.

Aspect 55: The method of any of Aspects 32-54, wherein the respective information associated with the C-WUS format includes at least one of an indication of a preferred uplink reference signal configuration or an indication of a preferred downlink reference signal configuration.

Aspect 56: The method of any of Aspects 32-55, wherein the respective information associated with the C-WUS format includes uplink jitter information.

Aspect 57: The method of any of Aspects 32-56, wherein the respective information associated with the C-WUS format includes UE energy information including at least one of a current energy state of the UE or a next energy state of the UE.

Aspect 58: The method of any of Aspects 32-57, wherein the respective information associated with the C-WUS format includes at least one of an indication of a requested uplink transport block size (TBS) or an indication of a requested downlink TBS.

Aspect 59: The method of any of Aspects 32-58, wherein the respective information associated with the C-WUS format includes at least one of: an indication of a requested uplink transport block size (TBS), an indication of a requested downlink TBS, or an indication of a maximum amount of downlink traffic supported by the UE in a time period.

Aspect 60: The method of any of Aspects 32-59, wherein the respective information associated with the C-WUS format includes an indication of a synchronization signal block (SSB) index selected by the UE.

Aspect 61: The method of any of Aspects 32-60, wherein the respective information associated with the C-WUS format includes an indication of a capability of the UE.

Aspect 62: The method of any of Aspects 32-61, wherein the respective information associated with the C-WUS format includes one or more emergency bits.

Aspect 63: A method of wireless communication performed by a user equipment (UE), comprising: receiving, from a network node, a first synchronization signal block (SSB) associated with a first network energy state (NES) of the network node, the first SSB including a first master information block (MIB) indicating first information different from second information indicated in a second MIB included in a second SSB associated with a second NES of the network node; and communicating with the network node based at least in part on the first SSB.

Aspect 64: The method of Aspect 63, wherein the first information includes an indication of whether a cell is barred.

Aspect 65: The method of any of Aspects 63-64, wherein the first information includes an indication of one or more cell wake-up signal (C-WUS) triggering conditions, the indication of the one or more C-WUS triggering conditions including at least one of: an uplink buffer status report (BSR) threshold, an uplink delay status report (DSR) threshold, an energy level threshold, a charging rate threshold, or a discharging rate threshold.

Aspect 66: The method of any of Aspects 63-65, wherein the first information includes one or more emergency bits.

Aspect 67: The method of any of Aspects 63-66, wherein the first information includes at least one of: an indication of a current NES of the network node, an indication of a remaining time in the current NES, an indication of a next NES of the network node, or an indication of a pattern of NESs for the network node.

Aspect 68: The method of any of Aspects 63-67, wherein the first information includes an indication of a system information block type 1 (SIB1) format of a plurality of SIB1 formats associated with the first NES.

Aspect 69: The method of any of Aspects 63-68, wherein the first information includes an indication of a system information change.

Aspect 70: The method of any of Aspects 63-69, wherein the first information includes at least one of: an indication of whether the network node supports low power wake-up signal (LP-WUS) transmission, an indication of one or more classes of wake-up radio (WUR) for which the network node supports LP-WUS transmission, or an indication of whether the network node supports transmission of at least one of a supported low power synchronization signal (LP-SS), a supported low power reference signal (LP-RS), or a supported preamble signal for each of the one or more classes of WUR for which the network node supports LP-WUS transmission.

Aspect 71: The method of any of Aspects 63-70, wherein the first information includes an indication of whether the network node supports wake-up radio (WUR)-based UEs in the first NES of the network node.

Aspect 72: The method of any of Aspects 63-71, wherein the first information includes an indication of whether wake-up radio (WUR)-based UEs are barred.

Aspect 73: The method of any of Aspects 63-72, wherein the first information includes at least one of: an indication of whether the network node supports one or more energy services, or an indication of whether the network node supports communication with at least one of passive devices, semi-passive devices, active tags, or energy harvesting devices.

Aspect 74: A method of wireless communication performed by a network node, comprising: transmitting a first synchronization signal block (SSB) associated with a first network energy state (NES) of the network node, the first SSB including a first master information block (MIB) indicating first information different from second information indicated in a second MIB included in a second SSB associated with a second NES of the network node; and communicating with a user equipment (UE) based at least in part on the first SSB.

Aspect 75: The method of Aspect 74, wherein the first information includes an indication of whether a cell is barred.

Aspect 76: The method of any of Aspects 74-75, wherein the first information includes an indication of one or more cell wake-up signal (C-WUS) triggering conditions, the indication of the one or more C-WUS triggering conditions including at least one of: an uplink buffer status report (BSR) threshold, an uplink delay status report (DSR) threshold, an energy level threshold, a charging rate threshold, or a discharging rate threshold.

Aspect 77: The method of any of Aspects 74-76, wherein the first information includes one or more emergency bits.

Aspect 78: The method of any of Aspects 74-77, wherein the first information includes at least one of: an indication of a current NES of the network node, an indication of a remaining time in the current NES, an indication of a next NES of the network node, or an indication of a pattern of NESs for the network node.

Aspect 79: The method of any of Aspects 74-78, wherein the first information includes an indication of a system information block type 1 (SIB1) format of a plurality of SIB1 formats associated with the first NES.

Aspect 80: The method of any of Aspects 74-79, wherein the first information includes an indication of a system information change.

Aspect 81: The method of any of Aspects 74-80, wherein the first information includes at least one of: an indication of whether the network node supports low power wake-up signal (LP-WUS) transmission, an indication of one or more classes of wake-up radio (WUR) for which the network node supports LP-WUS transmission, or an indication of whether the network node supports transmission of at least one of a supported low power synchronization signal (LP-SS), a supported low power reference signal (LP-RS), or a supported preamble signal for each of the one or more classes of WUR for which the network node supports LP-WUS transmission.

Aspect 82: The method of any of Aspects 74-81, wherein the first information includes an indication of whether the network node supports wake-up radio (WUR)-based UEs in the first NES of the network node.

Aspect 83: The method of any of Aspects 74-82, wherein the first information includes an indication of whether wake-up radio (WUR)-based UEs are barred.

Aspect 84: The method of any of Aspects 74-83, wherein the first information includes at least one of: an indication of whether the network node supports one or more energy services, or an indication of whether the network node supports communication with at least one of passive devices, semi-passive devices, active tags, or energy harvesting devices.

Aspect 85: An apparatus for wireless communication at a device, comprising a processor; memory coupled with the processor; and instructions stored in the memory and executable by the processor to cause the apparatus to perform the method of one or more of Aspects 1-84.

Aspect 86: A device for wireless communication, comprising a memory and one or more processors coupled to the memory, the one or more processors configured to perform the method of one or more of Aspects 1-84.

Aspect 87: An apparatus for wireless communication, comprising at least one means for performing the method of one or more of Aspects 1-84.

Aspect 88: A non-transitory computer-readable medium storing code for wireless communication, the code comprising instructions executable by a processor to perform the method of one or more of Aspects 1-84.

Aspect 89: A non-transitory computer-readable medium storing a set of instructions for wireless communication, the set of instructions comprising one or more instructions that, when executed by one or more processors of a device, cause the device to perform the method of one or more of Aspects 1-84.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term “component” is intended to be broadly construed as hardware and/or a combination of hardware and software. “Software” shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a “processor” is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the team "or" is intended to be inclusive when used in a series and may be used interchangeably with "and/or," unless explicitly stated otherwise (e.g., if used in combination with "cither" or "only one of").

What is claimed is:

1. A user equipment (UE), comprising:
- one or more memories; and
- one or more processors, coupled to the one or more memories, configured to:
  - receive, from a network node, cell wake-up signal (C-WUS) configuration information indicating a plurality of C-WUS formats, each C-WUS format of the plurality of C-WUS formats associated with respective information; and
  - transmit, to the network node, a C-WUS associated with a C-WUS format of the plurality of C-WUS formats, the C-WUS including the respective information associated with the C-WUS format.

2. The UE of claim 1, wherein the one or more processors are further configured to:
- communicate with the network node based at least in part on the respective information associated with the C-WUS format and included in the C-WUS.

3. The UE of claim 1, wherein the C-WUS configuration information indicates one or more C-WUS monitoring occasions, and wherein the one or more processors, to transmit the C-WUS, are configured to:
- transmit the C-WUS in a C-WUS monitoring occasion of the one or more C-WUS monitoring occasions.

4. The UE of claim 1, wherein the one or more processors are further configured to:
- receive, from the network node, an indication of the C-WUS format of the plurality of C-WUS formats.

5. The UE of claim 1, wherein the one or more processors, to transmit the C-WUS, are configured to:
- transmit the C-WUS in multiple stages including a first stage C-WUS indicating first information of the respective information associated with the C-WUS format and a second stage C-WUS indicating second information of the respective information associated with the C-WUS format.

6. The UE of claim 5, wherein the one or more processors, to transmit the C-WUS in multiple stages, are configured to:
- transmit the first stage C-WUS in a first stage monitoring occasion of a C-WUS monitoring occasion; and
- transmit the second stage C-WUS in a second stage monitoring occasion of the C-WUS monitoring occasion.

7. The UE of claim 1, wherein the one or more processors, to transmit the C-WUS, are configured to:
- transmit, in a first stage, an indication of the C-WUS format associated with the C-WUS; and
- transmit, in one or more second stages, the C-WUS including the respective information associated with the C-WUS format.

8. The UE of claim 7, wherein the one or more processors, to transmit, in the first stage, the indication of the C-WUS format, are configured to transmit the indication of the C-WUS format in a first stage monitoring occasion of a C-WUS monitoring occasion, and wherein the one or more processors, to transmit, in the one or more second stages, the C-WUS including the respective information associated with the C-WUS format, are configured to transmit the C-WUS including the respective information associated with the C-WUS format in one or more second stage monitoring occasions of the C-WUS monitoring occasion.

9. The UE of claim 7, wherein the one or more processors, to transmit, in the first stage, the indication of the C-WUS format, are configured to:
- transmit, in the first stage, uplink control information (UCI) indicating the C-WUS format.

10. The UE of claim 7, wherein the one or more processors are further configured to:
- select the C-WUS format associated with the C-WUS from the plurality of C-WUS formats.

11. The UE of claim 1, wherein the respective information associated with the C-WUS format includes at least one of:
- an uplink buffer status report (BSR),
- an uplink delay status report (DSR),
- an indication of whether a threshold associated with the uplink BSR is satisfied, or
- an indication of whether a threshold associated with the uplink DSR is satisfied.

12. The UE of claim 1, wherein the respective information associated with the C-WUS format includes a request for a system information block type 1 (SIB1) and an indication of a minimum time offset between the C-WUS and the SIB1.

13. The UE of claim 1, wherein the respective information associated with the C-WUS format includes a positioning or sensing request and at least one of:

an indication of a time offset between the C-WUS and a start of a positioning or sensing procedure associated with the positioning or sensing request, or an indication of at least one of a priority or latency associated with the positioning or sensing request.

14. The UE of claim 1, wherein the respective information associated with the C-WUS format includes at least one of:

a channel state information (CSI) report for a Uu link, a CSI report for a sidelink, or power headroom report (PHR).

15. The UE of claim 1, wherein the respective information associated with the C-WUS format includes at least one of:

an indication of one or more traffic types associated with uplink or sidelink packets to be transmitted by the UE, an indication of one or more logical channel group (LCG) identifiers, an indication of a remaining packet delay budget (PDB) associated with a highest priority packet of the uplink or sidelink packets to be transmitted by the UE, an indication of a minimum remaining PDB across all of the uplink or sidelink packets to be transmitted by the UE, or an indication of a highest priority associated with the uplink or sidelink packets to be transmitted by the UE.

16. The UE of claim 1, wherein the respective information associated with the C-WUS format includes at least one of:

a scheduling request for a sidelink communication, or an energy request associated with energy harvesting by the UE.

17. The UE of claim 1, wherein the respective information associated with the C-WUS format includes at least one of:

an indication of a configuration of a low power wake-up signal (LP-WUS) associated with a wake-up radio (WUR) of the UE, an activation indication associated with the LP-WUS, a configuration of one or more low power synchronization signals (LP-SSs) associated with synchronization of the WUR of the UE, or an indication of whether the LP-WUS supports synchronization signal block (SSB) configuration for the UE.

18. The UE of claim 1, wherein the respective information associated with the C-WUS format includes at least one of:

an indication of one or more preferred configured grant (CG) configurations, an indication of one or more preferred semi-persistent scheduling (SPS) configurations, an activation indication associated with one or more CG configurations, or an activation indication associated with one or more SPS configurations.

19. The UE of claim 1, wherein the respective information associated with the C-WUS format includes an indication of at least one of a preferred discontinuous reception (DRX) configuration or a preferred discontinuous transmission (DTX) configuration.

20. The UE of claim 1, wherein the respective information associated with the C-WUS format includes at least one of an indication of a preferred uplink reference signal configuration or an indication of a preferred downlink reference signal configuration.

21. The UE of claim 1, wherein the respective information associated with the C-WUS format includes uplink jitter information.

22. The UE of claim 1, wherein the respective information associated with the C-WUS format includes UE energy information including at least one of a current energy state of the UE or a next energy state of the UE.

23. The UE of claim 1, wherein the respective information associated with the C-WUS format includes at least one of:

an indication of a requested uplink transport block size (TBS), an indication of a requested downlink TBS, or an indication of a maximum amount of downlink traffic supported by the UE in a time period.

24. The UE of claim 1, wherein the respective information associated with the C-WUS format includes an indication of a synchronization signal block (SSB) index selected by the UE.

25. The UE of claim 1, wherein the respective information associated with the C-WUS format includes an indication of a capability of the UE.

26. A network node, comprising:

one or more memories; and one or more processors, coupled to the one or more memories, configured to:

transmit cell wake-up signal (C-WUS) configuration information indicating a plurality of C-WUS formats, each C-WUS format of the plurality of C-WUS formats associated with respective information; and receive, from a user equipment (UE), a C-WUS associated with a C-WUS format of the plurality of C-WUS formats, the C-WUS including the respective information associated with the C-WUS format.

27. The network node of claim 26, wherein the one or more processors are further configured to:

switch from a first network energy state to a second network energy state in connection with receiving the C-WUS; and communicate with the UE based at least in part on the respective information associated with the C-WUS format and included in the C-WUS.

28. A method of wireless communication performed by a user equipment (UE), comprising:

receiving, from a network node, cell wake-up signal (C-WUS) configuration information indicating a plurality of C-WUS formats, each C-WUS format of the plurality of C-WUS formats associated with respective information; and transmitting, to the network node, a C-WUS associated with a C-WUS format of the plurality of C-WUS formats, the C-WUS including the respective information associated with the C-WUS format.

29. The method of claim 28, further comprising:

communicating with the network node based at least in part on the respective information associated with the C-WUS format and included in the C-WUS.

30. A method of wireless communication performed by a network node, comprising:

transmitting cell wake-up signal (C-WUS) configuration information indicating a plurality of C-WUS formats, each C-WUS format of the plurality of C-WUS formats associated with respective information; and receiving, from a user equipment (UE), a C-WUS associated with a C-WUS format of the plurality of C-WUS formats, the C-WUS including the respective information associated with the C-WUS format.

* * * * *